US012631809B2

(12) United States Patent
Nakayama et al.

(10) Patent No.: US 12,631,809 B2
(45) Date of Patent: May 19, 2026

(54) OPTICAL FILTER

(71) Applicant: AGC Inc., Tokyo (JP)

(72) Inventors: Motoshi Nakayama, Tokyo (JP); Takashi Nagata, Shizuoka (JP); Kazuhiko Shiono, Fukushima (JP); Takeru Wakabayashi, Tokyo (JP)

(73) Assignee: AGC Inc., Tokyo (JP)

( * ) Notice: Subject to any disclaimer, the term of this patent is extended or adjusted under 35 U.S.C. 154(b) by 284 days.

(21) Appl. No.: 18/418,416

(22) Filed: Jan. 22, 2024

(65) Prior Publication Data

US 2024/0176054 A1 May 30, 2024

Related U.S. Application Data

(63) Continuation of application No. PCT/JP2022/028278, filed on Jul. 20, 2022.

(30) Foreign Application Priority Data

Jul. 30, 2021 (JP) ................................ 2021-126030

(51) Int. Cl.
*G02B 5/00* (2006.01)
*G02B 5/20* (2006.01)

(52) U.S. Cl.
CPC .................................... *G02B 5/208* (2013.01)

(58) Field of Classification Search
CPC . G02B 5/208; G02B 5/22; G02B 5/26; G02B 5/28; G02B 5/281; G02B 5/282; G02B 5/3075; G02B 13/14; G02B 5/3091; G02B 17/0892; G02B 19/009; G02B 19/0042; G02B 19/0095; G02B 21/0016; G02B 21/16; G02B 27/4294; C03C 4/082; C03C 4/10; G03F 7/70
USPC .......................................................... 359/350
See application file for complete search history.

(56) References Cited

U.S. PATENT DOCUMENTS

2016/0170105 A1 6/2016 Nagaya et al.
2017/0017024 A1 1/2017 Hasegawa et al.

FOREIGN PATENT DOCUMENTS

JP 2014-235264 A 12/2014
JP 5884953 B2 3/2016
JP WO2016088644 A1 * 11/2017 ............ H04N 23/20
JP 2020-74366 A 5/2020
WO WO 2016/114363 A1 7/2016

OTHER PUBLICATIONS

International Search Report issued Sep. 27, 2022 in PCT/JP2022/028278 filed on Jul. 20, 2022, 2 pages.

* cited by examiner

*Primary Examiner* — Henry Duong
(74) *Attorney, Agent, or Firm* — Oblon, McClelland, Maier & Neustadt, L.L.P.

(57) ABSTRACT

An optical filter, includes: a near infrared ray absorbing glass, dielectric multilayer films laid on or above both major surfaces of the near infrared ray absorbing glass, and an absorption layer laid on or above a surface of at least one of the dielectric multilayer films and having a maximum absorption wavelength in a near infrared light region, in which the optical filter satisfies all of spectral characteristics (i-1) to (i-5).

12 Claims, 8 Drawing Sheets

OPTICAL FILTER

CROSS-REFERENCE TO RELATED APPLICATIONS

This is a bypass continuation of International Patent Application No. PCT/JP2022/028278, filed on Jul. 20, 2022, which claims priority to Japanese Patent Application No. 2021-126030, filed on Jul. 30, 2021. The contents of these applications are hereby incorporated by reference in their entireties.

TECHNICAL FIELD

The present invention relates to an optical filter that selectively transmits a visible light region and a specific near infrared light region and shields light other than that in the regions.

BACKGROUND ART

For an imaging device including a solid state image sensor, an application thereof is extended to a device that takes an image anytime during day and night, such as a monitoring camera or an in-vehicle camera. In such a device, it is necessary to acquire (color) images based on visible light and (monochrome) images based on infrared light.

Therefore, there has been studied use of an optical filter having, in addition to a near infrared ray cut filter function for transmitting visible light and correctly reproducing an image based on the visible light, a function of selectively transmitting a specific near infrared light, that is, a dual band pass filter.

Patent Literature 1 discloses an optical filter in which a dielectric multilayer film and a resin substrate containing a near infrared ray absorbing pigment are combined, and near infrared light in the vicinity of 800 nm and visible light are transmitted and other light is shielded.

Patent Literature 1: Japanese Patent No. 5884953

SUMMARY OF INVENTION

However, the optical filter disclosed in Patent Literature 1 does not have a sufficient shielding property for near infrared light of 1,000 nm to 1,200 nm.

In recent years, there has been studied mounting of an imaging device capable of simultaneously acquiring an image based on visible light and an image based on infrared light in order to reduce the number of imaging devices mounted on an ARVR device and to save space. In the ARVR device, an image having a higher image quality than that of an in-vehicle camera or a monitoring camera is required. Since the image sensor has sensitivity even at a wavelength of 1,000 nm to 1,200 nm, in a case where the light shielding property for the near infrared light of 1,000 nm to 1,200 nm is not sufficient, image quality deterioration due to unnecessary light called flare or ghost occurs in the acquired image of visible light and image of infrared light, and the image quality is insufficient for use in ARVR device applications. From such a viewpoint, an optical filter capable of sufficiently shielding a region of 1,000 nm to 1,200 nm is required.

From the viewpoint of performance, the optical filter is desired to be capable of correcting a light receiving sensitivity curve of the image sensor so as to approximate to a human visual sensitivity curve, and to have a weather resistance even under a high temperature and a high humidity.

An object of the present invention is to provide an optical filter which is excellent in transmittance of visible light and a specific near infrared light, sufficiently shields other near infrared light, in particular, a wavelength region of 1,000 nm to 1,200 nm, is further excellent in a visual sensitivity correction property in a visible region, and has a high reliability on a weather resistance.

The present invention provides an optical filter having the following configuration.

[1] An optical filter, including:

a near infrared ray absorbing glass, dielectric multilayer films laid on or above both major surfaces of the near infrared ray absorbing glass, and an absorption layer laid on or above a surface of at least one of the dielectric multilayer films and having a maximum absorption wavelength in a near infrared light region, in which the optical filter satisfies all of the following spectral characteristics (i-1) to (i-5):

(i-1) in a spectral transmittance curve at a wavelength of 450 nm to 600 nm and an incident angle of 0 degrees, an average transmittance $T_{450\text{-}600(0deg)AVE}$ is 60% or more, (i-2) in a spectral transmittance curve at a wavelength of 700 nm to 750 mm and an incident angle of 0 degrees, an average transmittance $T_{700\text{-}750(0deg)AVE}$ is 5% or less, (i-3) in a spectral transmittance curve at a wavelength of 1,050 nm to 1,200 mm and an incident angle of 0 degrees, a maximum transmittance $T_{1050\text{-}1200(0deg)MAX}$ is 7% or less.

(i-4) in a spectral transmittance curve at a wavelength of 800 nm to 1,000 nm and an incident angle of 0 degrees, a maximum transmittance $T_{800\text{-}1000(0deg)MAX}$ is 20% or more, and (i-5) when a maximum transmittance in the spectral transmittance curve at a wavelength of 450 nm to 600 nm and an incident angle of 0 degrees is $T_{450\text{-}600(0deg)MAX}$, in the spectral transmittance curve at an incident angle of 0 degrees, a wavelength $\lambda_{(70\%)}$ at which a transmittance is 70% of $T_{450\text{-}600(0deg)MAX}$ tax and a wavelength $\lambda_{(30\%)}$ at which a transmittance is 30% of $T_{450\text{-}600(0deg)MAX}$ are included in a range of 600 nm to 700 nm, and when the transmittance at the wavelength $\lambda_{(70\%)}$ is $T_{(70\%)}$ and the transmittance at the wavelength $\lambda_{(30\%)}$ is $T_{(30\%)}$, the following relational expression is satisfied:

$$-2\leq[T_{(30\%)}-T_{(70\%)}]/[\lambda_{(30\%)}-\lambda_{(70\%)}]\leq-0.75.$$

According to the present invention, it is possible to provide an optical filter which is excellent in transmittance of visible light and a specific near infrared light, particularly in a wavelength region of 800 nm to 900 nm, is excellent in shielding property of other near infrared light, in particular, a wavelength region of 1,000 nm to 1,200 nm, is further excellent in a visual sensitivity correction property in a visible region, and has a high reliability on a weather resistance.

DESCRIPTION OF EMBODIMENTS

Figure 1:
FIG. 1 is a cross-sectional view schematically illustrating an example of an optical filter according to one embodiment.

Hereinafter, embodiments of the present invention will be described.

In the present description, a near infrared ray absorbing pigment may be abbreviated as a "NIR pigment", and an ultraviolet absorbing pigment may be abbreviated as a "UV pigment".

In the present description, a compound represented by a formula (I) is referred to as a compound (I). The same applies to compounds represented by other formulae. A pigment composed of the compound (I) is also referred to as a pigment (I), and the same applies to other pigments. In addition, a group represented by the formula (I) is also referred to as a group (I), and the same applies to groups represented by other formulae.

In the present description, internal transmittance is transmittance obtained by subtracting an influence of interface reflection from measured transmittance, which is represented by a formula {measured transmittance/(100−reflectance)}×100.

In the present description, an absorbance is converted from (internal) transmittance by a formula of $-\log_{10}$((internal) transmittance/100).

In the present description, transmittance of a substrate and a spectrum of transmittance of an absorption layer including a case where a pigment is contained in a resin are all "internal transmittance" even when described as "transmittance". On the other hand, transmittance measured by dissolving a pigment in a solvent such as dichloromethane, transmittance of a dielectric multilayer film, and transmittance of an optical filter including the dielectric multilayer film are measured transmittance.

In the present description, transmittance of, for example, 90% or more in a specific wavelength region means that the transmittance does not fall below 90% in the entire wavelength region, that is, a minimum transmittance is 90% or more in the wavelength region. Similarly, transmittance of, for example, 1% or less in the specific wavelength region means that the transmittance does not exceed 1% in the entire wavelength region, that is, a maximum transmittance is 1% or less in the wavelength region. The same applies to the internal transmittance. An average transmittance and an average internal transmittance in the specific wavelength region are the arithmetic mean of a transmittance and an internal transmittance per 1 nm in the wavelength region.

Spectral characteristics can be measured by using an ultraviolet-visible spectrophotometer.

In the present description, the symbol "−" or the word "to" that is used to express a numerical range includes the numerical values before and after the symbol or the word as the upper limit and the lower limit of the range, respectively.

<Optical Filter>

An optical filter (hereinafter, also referred to as "the filter") according to one embodiment of the present invention includes a near infrared ray absorbing glass, dielectric multilayer films laid on or above both major surfaces of the near infrared ray absorbing glass, and an absorption layer laid on or above a surface of at least one of the dielectric multilayer films and having a maximum absorption wavelength in a near infrared light region.

Reflection characteristics of the dielectric multilayer film and absorption characteristics of the near infrared ray absorbing glass and the absorption layer allow the optical filter as a whole to achieve an excellent transmittance in a visible light region and a specific near infrared light region, and an excellent shielding property in another near infrared light region.

Figure 2:
FIG. 2 is a cross-sectional view schematically illustrating another example of the optical filter according to one embodiment.

A configuration example of the filter will be described with reference to the drawings. FIGS. 1 and 2 are cross-sectional views schematically illustrating examples of the optical filter according to one embodiment.

An optical filter 1A illustrated in FIG. 1 is an example in which a near infrared ray absorbing glass 10, a dielectric multilayer film 21 laid on one major surface of the near infrared ray absorbing glass 10, and a dielectric multilayer film 22 laid on the other major surface thereof are provided, and an absorption layer 30 is further provided on a surface of the dielectric multilayer film 22.

Here, the dielectric multilayer films 21 and 22 are preferably laid in contact with the major surfaces of the near infrared ray absorbing glass 10. In the case of the near infrared ray absorbing glass, a glass obtained by adding copper or iron to a phosphate glass or a fluorophosphate glass for absorbing the near infrared ray is often used, but components such as $P_2O_5$ contained in the glass tend to be easily eluted into water in the environment. Since the dielectric multilayer film is usually made of an inorganic material, the dielectric multilayer film also functions as a barrier layer that prevents contact between the glass and water by being directly laid on both major surfaces of the near infrared ray absorbing glass. Accordingly, deterioration of the near infrared ray absorbing glass is prevented, and an optical filter having a high reliability can be obtained.

An optical filter 1B illustrated in FIG. 2 is an example in which a dielectric multilayer film 23 is further provided on a surface of the absorption layer 30.

The optical filter according to the present invention satisfies all of the following spectral characteristics (i-1) to (i-5):

(i-1) in a spectral transmittance curve at a wavelength of 450 nm to 600 nm and an incident angle of 0 degrees, an average transmittance $T_{450\text{-}600(0deg)AVE}$ is 60% or more, (i-2) in a spectral transmittance curve at a wavelength of 700 nm to 750 nm and an incident angle of 0 degrees, an average transmittance $T_{700\text{-}750(0deg)AVE}$ is 5% or less, (i-3) in a spectral transmittance curve at a wavelength of 1,050 nm to 1,200 nm and an incident angle of 0 degrees, a maximum transmittance $T_{1050\text{-}1200(0deg)MAX}$ is 7% or less, (i-4) in a spectral transmittance curve at a wavelength of 800 nm to 1,000 nm and an incident angle of 0 degrees, a maximum transmittance $T_{800\text{-}1000(0deg)MAX}$ is 20% or more, and (i-5) when a maximum transmittance in the spectral transmittance curve at a wavelength of 450 nm to 600 nm and an incident angle of 0 degrees is $T_{450\text{-}600(0deg)MAX}$, in the spectral transmittance curve at an incident angle of 0 degrees, a wavelength $\lambda_{(70\%)}$ at which a transmittance is 70% of $T_{450\text{-}600(0deg)MAX}$ and a wavelength $\lambda_{(30\%)}$ at which a transmittance is 30% of $T_{450\text{-}600(0deg)MAX}$ are included in a range of 600 nm to 700 nm, and when the transmittance at the wavelength $\lambda_{(70\%)}$ is $T_{(70\%)}$ and the transmittance at the wavelength $\lambda_{(30\%)}$ is $T_{(30\%)}$, the following relational expression is satisfied:

$$-2\leq[T_{(30\%)}-T_{(70\%)}]/[\lambda_{(30\%)}-\lambda_{(70\%)}]-0.75.$$

The filter satisfying all of the spectral characteristics (i-1) to (i-5) is a dual passband filter excellent in transmittance of visible light as shown in the characteristic (i-1) and in transmittance of a specific near infrared light as shown in the characteristic (i-4), excellent in shielding property of other near infrared light as shown in the characteristics (i-2) and (i-3), and excellent in visual sensitivity correction property of visible region as shown in the characteristic (i-5).

It means that by satisfying the spectral characteristic (i-1), the transmittance in the visible light region of 450 nm to 60 nm is excellent.

$T_{450\text{-}600(0deg)MAX}$ is preferably 80% or more, and more preferably 88% or more.

In addition, in order to satisfy the spectral characteristic (i-1), for example, a dielectric multilayer film, an absorption layer, or a glass having an excellent transmittance in the visible light region may be used.

It means that by satisfying the spectral characteristic (i-2), the shielding property of the near infrared light region of 700 nm to 750 nm is excellent.

$T_{700\text{-}750(0deg)AVE}$ is preferably 2% or less, and more preferably 1% or less.

In addition, in order to satisfy the spectral characteristic (i-2), for example, an absorption layer containing a near infrared ray absorbing pigment may be used, and light may be shielded by an absorption ability of the pigment.

It means that by satisfying the spectral characteristic (i-3), the shielding property of the near infrared light region of 1,000 nm to 1,200 nm is excellent.

$T_{1050\text{-}1200(0deg)MAX}$ is preferably 3% or less, and more preferably 1% or less.

In addition, in order to satisfy the spectral characteristic (i-3), for example, a glass that absorbs a near infrared light of 1,000 nm or longer may be used.

It means that by satisfying the spectral characteristic (i-4), the transmittance in the near infrared light region of 800 nm to 1,000 nm is excellent.

$T_{800\text{-}1000(0deg)MAX}$ is preferably 40% or more, and more preferably 60% or more.

In addition, in order to satisfy the spectral characteristic (i-4), for example, a dielectric multilayer film excellent in transmittance of the near infrared light region of 800 nm to 1,000 nm may be used.

The relational expression $[T_{(30\%)}-T_{(70\%)}]/[\lambda_{(30\%)}-\lambda_{(70\%)}]$ in the spectral characteristic (i-5) means a degree of fall (an inclination of a cutoff of a visible band) of a spectral transmittance curve in a wavelength region of 600 nm to 700 nm which is switched from visible light to be transmitted to near infrared light to be shielded. From the viewpoint of efficiently taking in light, it is more ideal as the spectral curve in a boundary region between a transmission region and a shielding region is steeper, but from the viewpoint of performance, correcting the spectral curve such that the light receiving sensitivity approximates a visibility curve can bring a sensation closer to that seen with human eyes. It means that when the above-mentioned relational expression (inclination) in the spectral characteristic (i-5) is −2 or more and −0.75 or less, the visual sensitivity correction property of the visible region is excellent.

The above-mentioned relational expression (inclination) in the spectral characteristic (i-5) is preferably −1.5 or more, and more preferably −0.8 or less.

In order to satisfy the spectral characteristic (i-5), for example, an absorption layer containing a near infrared ray absorbing pigment may be used, and light may be shielded by the absorption ability of the pigment.

The optical filter according to the present invention preferably further satisfies the following spectral characteristic (i-6):

(i-6) when a transmittance at a wavelength λ in a spectral transmittance curve at an incident angle of 0 degrees is $T_{(0deg)}(\lambda)$ and a transmittance at the wavelength λ in a spectral transmittance curve at an incident angle of 35 degrees is $T_{(35deg)}(\lambda)$, the following relational expression is satisfied in a wavelength range of 450 nm≤λ≤600 nm:

$$|T_{(0deg)}(\lambda)-T_{(35deg)}(\lambda)|\leq 10\%$$

The relational expression of the characteristic (i-6) means that the visible light transmittance in 450 nm to 600 nm is less likely to change even at a high incident angle, that is, a ripple is prevented.

$|T_{(0deg)}(\lambda)-T_{(35deg)}(\lambda)|$ is preferably 7% or less, and more preferably 4% or less.

A ripple is generated by a change in the transmittance of the visible light region due to interference caused by reflected light of an interface between respective layers according to the number of laid layers of the multilayer film for reflecting the near infrared region, and is larger as an incident angle is larger. In order to satisfy the characteristic (i-6), for example, a dielectric multilayer film in which the ripple is prevented by controlling the number of laid layers may be used, and an infrared ray absorbing glass may be used in order to compensate for the light shielding property of the near infrared region.

The optical filter according to the present invention preferably further satisfies the following spectral characteristic (i-7):

(i-7) when the maximum transmittance in the spectral transmittance curve at a wavelength of 450 nm to 600 nm and an incident angle of 0 degrees is $T_{450\text{-}600(0deg)MAX}$, a wavelength $\lambda_{VIS(0deg)(50\%)}$ at which $T_{450\text{-}600(0deg)MAX}$ is 50% at an incident angle of 0 degrees and a wavelength $\lambda_{VIS(35deg)(50\%)}$ at which $T_{450\text{-}600(0deg)MAX}$ is 50% at an incident angle of 35 degrees are included in a range of 600 nm to 700 nm, and the following relational expression is satisfied:

$$|\lambda_{VIS(0deg)(50\%)}-\lambda_{VIS(35deg)(50\%)}|\leq 10\text{ nm}.$$

It means that by satisfying the spectral characteristic (i-7), a spectral curve in a region of 600 nm to 700 nm is hardly shifted even at a high incident angle.

$|\lambda_{VIS(0deg)(50\%)}-\lambda_{VIS(35deg)(50\%)}|$ is preferably 7 nm or less, and more preferably 5 nm or less.

In order to satisfy the spectral characteristic (i-7), for example, an absorption layer containing a near infrared ray absorbing pigment may be used, and light may be shielded by the absorption ability of the pigment.

The optical filter according to the present invention preferably further satisfies the following spectral characteristic (i-8):

(i-8) in the spectral transmittance curve at a wavelength of 800 nm to 1,000 nm and an incident angle of 0 degrees, when the maximum transmittance is $T_{800\text{-}1000(0deg)MAX}$ and a wavelength at which the maximum transmittance is obtained is $\lambda_{800\text{-}1000(0deg)MAX}$, a wavelength $\lambda_{IRS(0deg)(50\%)}$ at which a transmittance is 50% of $T_{800\text{-}1000(0deg)MAX}$ in a spectral transmittance curve in a range of 750 nm to $\lambda_{800\text{-}1000(0deg)MAX}$ nm and at an incident angle of 0 degrees, and a wavelength $\lambda_{IRS(35deg)(50\%)}$ at which a transmittance is 50% of $T_{800\text{-}1000(0deg)MAX}$ in a spectral transmittance curve in the range of 750 nm to $\lambda_{800\text{-}1000(0deg)MAX}$ nm and at an incident angle of 35 degrees satisfy the following relational expression:

$$|\lambda_{IRS(0deg)(50\%)}-\lambda_{IRS(0deg)(50\%)}|\leq 30\text{ nm.}$$

It means that by satisfying the spectral characteristic (i-8), a spectral curve in a region of 750 nm to $\lambda_{800\text{-}1000(0deg)MAX}$ nm is hardly shifted even at a high incident angle.

$|\lambda_{IRS(0deg)(50\%)}-\lambda_{IRS(35deg)(50\%)}|$ is preferably 20 nm or less, and more preferably 10 nm or less.

In order to satisfy the spectral characteristic (i-8), for example, an absorption layer containing a near infrared ray absorbing pigment may be used, and light may be shielded by the absorption ability of the pigment.

The optical filter according to the present invention preferably further satisfies the following spectral characteristic (i-9):

(i-9) in the spectral transmittance curve at a wavelength of 800 nm to 1,000 nm and an incident angle of 0 degrees, when the maximum transmittance is $T_{800\text{-}1000(0deg)MAX}$ and a wavelength at which the maximum transmittance is obtained is $\lambda_{800\text{-}1000(0deg)MAX}$, a wavelength $\lambda_{IRL(0deg)(50\%)}$ at which a transmittance is 50% of $T_{800\text{-}1000(0deg)MAX}$ in a spectral transmittance curve in a range of $\lambda_{800\text{-}1000(0deg)MAX}$ nm to 1,050 nm and at an incident angle of 0 degrees, and a wavelength $\lambda_{IRL(35deg)(50\%)}$ at which a transmittance is 50% of $T_{800\text{-}1000(0deg)MAX}$ in a spectral transmittance curve in the range of $\lambda_{800\text{-}1000(0deg)MAX}$ nm to 1,050 nm and at an incident angle of 35 degrees satisfy the following relational expression:

$$|\lambda_{IRL(0deg)(50\%)}-\lambda_{IRL(35deg)(50\%)}|\leq 60\text{ nm.}$$

It means that by satisfying the spectral characteristic (i-9), a spectral curve in a region of $\lambda_{800\text{-}1000(0deg)MAX}$ to 1,050 nm is hardly shifted even at a high incident angle.

$|\lambda_{IRL(0deg)(50\%)}-\lambda_{IRL(35deg)(50\%)}|$ is preferably 55 nm or less, and more preferably 50 nm or less.

In order to satisfy the spectral characteristic (i-8), for example, an absorption layer containing a near infrared ray absorbing pigment may be used, and light may be shielded by the absorption ability of the pigment.

The optical filter according to the present invention preferably further satisfies the following spectral characteristics (i-10) and (i-11):

(i-10) in a spectral reflectance curve at an incident angle of 5 degrees on at least one of surfaces, an average reflectance $R_{450\text{-}600(5deg)AVE}$ at the wavelength of 450 nm to 600 nm is 15% or less, and (i-11) in the spectral reflectance curve at an incident angle of 5 degrees on at least one of surfaces, an average reflectance $R_{1050\text{-}1200(5deg)MAX}$ at the wavelength of 1,050 nm to 1,200 nm is 40% or more.

The spectral characteristics (i-10) and (i-11) mean that at least one of the dielectric multilayer films is a multilayer film having reflection characteristics in the near infrared region.

$R_{450\text{-}600(5deg)AVE}$ is preferably 5% or less, and more preferably 3% or less.

$R_{1050\text{-}1200(5deg)AVE}$ is preferably 80% or more, and more preferably 90% or more.

<Near Infrared Ray Absorbing Glass>

The filter includes a near infrared ray absorbing glass. The light shielding property of the dielectric multilayer film can be compensated by shielding the near infrared light region with the absorption ability of the glass.

The near infrared ray absorbing glass preferably satisfies all of the following spectral characteristics (iii-1) to (iii-3):

(iii-1) an average internal transmittance $T_{G\_450\text{-}600AVE}$ in a spectral transmittance curve at the wavelength of 450 nm to 600 nm is 80% or more, (iii-2) an average internal transmittance $T_{G\_1050\text{-}1200AVE}$ in a spectral transmittance curve at the wavelength of 1,050 nm to 1.200 nm is lower than the average internal transmittance $T_{G\_450\text{-}600AVE}$, and (iii-3) an internal transmittance $T_{G\_800\text{-}1000}$ at the wavelength of 800 nm to 1,000 nm monotonically decreases.

The characteristic (iii-1) means that transmittance in the visible light region of the wavelength of 450 nm to 600 nm is excellent.

$T_{G\_450\text{-}600AVE}$ is preferably 90% or more, and more preferably 95% or more.

The characteristic (iii-2) means that the light shielding property of the near infrared light region of the wavelength of 1,050 nm to 1,200 nm is excellent.

$T_{G\_1050\text{-}1200AVE}$ is preferably 30% or less, and more preferably 20% or less.

It means that by satisfying the characteristic (iii-3), an absorption band becomes a wavelength region of 1,000 nm or longer, and light in the region can be sufficiently absorbed. Here, the monotonic decrease preferably means that an internal transmittance $T_{G\_800}$ at a wavelength of 800 nm, an internal transmittance $T_{G\_900}$ at a wavelength of 900 nm, and an internal transmittance $T_{G\_1000}$ at a wavelength of 1,000 nm satisfy the following relation.

$$T_{G\_800}>T_{G\_900}>T_{G\_1000}$$

In addition, $T_{G\_800}$ is preferably 55% or more, and $T_{G\_1000}$ is preferably 40% or less.

In particular, by shielding the wavelength of 1,050 nm to 1,200 nm by the absorption ability of the glass as shown in the characteristic (iii-2), the wavelength range where there is room for improvement in an optical filter in the related art can be sufficiently shielded.

The near infrared ray absorbing glass is not limited as long as it is a glass that can achieve the above-mentioned spectral characteristics, for example, a fluorophosphate glass containing iron or copper or a phosphate glass containing iron or copper is preferably used, and among those, a fluorophosphate glass containing iron or a phosphate glass containing iron is more preferable, and a phosphate glass containing iron is particularly preferable, from the viewpoint of easily achieving the above-mentioned spectral characteristics.

Examples of the phosphate glass containing iron (iron phosphate glass) include a glass having any of the following compositions.

(1) A glass containing, in terms of mol % of oxides, $P_2O_5$, $Al_2O_3$, R'O (where R'O represents any one or more selected from MgO, CaO, SrO, BaO, and ZnO), and $Fe_2O_3$ as essential components, containing substantially no F (fluorine component), and containing 0.1% to 35% of $Fe_2O_3$.

(2) A glass containing, in terms of mol % of oxides, 40% to 75% of $P_2O_5$, 5% to 22% of $Al_2O_3$, 0% to 20% of $R_2O$ (where $R_2O$ represents a total content of $Li_2O$, $Na_2O$, and $K_2O$), 0.1% to 35% of R"O (where R"O represents a total content of MgO, CaO, SrO, BaO, and ZnO), and 5% to 35% of $Fe_2O_3$.

(3) A glass containing, in terms of mol % of oxides, 25% to 75% of $P_2O_5$, 2.5% to 22% of $Al_2O_3$, 0% to 35% of $R_2O$ (where $R_2O$ represents a total content of $Li_2O$, $Na_2O$, and $K_2O$), 0.1% to 35% of R"O (where R"O represents a total content of MgO, CaO, SrO, BaO, and ZnO), and 0.1% to 5% (5% is not included) of $Fe_2O_3$.

(4) A glass containing, in terms of mol % of oxides, 40% to 75% of $P_2O_5$, 5% to 22% of $Al_2O_3$, 0.1% to 20% of $R_2O$ (where $R_2O$ represents a total content of $Li_2O$, $Na_2O$, and $K_2O$), 0.1% to 25% of R"O (where R"O represents a total content of MgO, CaO, SrO, BaO, and ZnO), and 0.1% to 5% (5% is not included) of $Fe_2O_3$.

In addition, it is preferable that the glass having any of the compositions of the above-mentioned (1) to (4) contains 0.1% to 20% of ZnO in terms of mol % of oxides.

In the glass having any of the compositions of the above-mentioned (1) to (4), a mass ratio (($Fe^{2+}$/total Fe amount)×100 [%]) of divalent iron ($Fe^{2+}$) in total iron (total Fe amount) converted to $Fe_2O_3$ is preferably 25% to 99%.

The near infrared ray absorbing glass may be a commercially available product, or may be manufactured by a known method. For example, an iron phosphate glass disclosed in WO2020/262296 may be used.

In addition, as the near infrared ray absorbing glass, a chemically strengthened glass may be used which is obtained by exchanging alkali metal ions (for example, Li ions and Na ions) having a small ionic radius present on a major surface of a glass plate with alkali ions having a larger ionic radius (for example, Na ions or K ions with respect to Li ions and K ions with respect to Na ions) by ion exchange at a temperature equal to or lower than a glass transition point.

The thickness of the near infrared ray absorbing glass is preferably 0.5 mm or less, more preferably 0.3 mm or less from the viewpoint of reduction in height of camera modules, and is preferably 0.15 mm or more from the viewpoint of element strength.

<Dielectric Multilayer Film>

In the filter, the dielectric multilayer film is laid on or above both surfaces of the near infrared ray absorbing glass. As a result, an optical filter is obtained in which entry of water as a cause of deterioration of the near infrared ray absorbing glass is prevented and a weather resistance is excellent.

In the filter, it is preferable that at least one side of the dielectric multilayer film is designed as a near infrared ray reflection layer (hereinafter, also referred to as a NIR reflection layer). It is preferable that the other side of the dielectric multilayer film is designed as a NIR reflection layer, a reflection layer having a reflection region other than the near infrared region, or an antireflection layer.

The NIR reflection layer in the filter has, for example, a wavelength selectivity of transmitting visible light and a specific near infrared light and mainly reflecting light other than that in a transmission region of the absorption layer and the specific near infrared light. A reflection region of the NIR reflection layer may include a light shielding region in the near infrared region of the absorption layer. The NIR reflection layer is not limited to have NIR reflection characteristics, and may be appropriately designed in a specification of further shielding light in a wavelength region other than the near infrared region, for example, a near ultraviolet region.

As the dielectric multilayer film when designed as the NIR reflection layer, the dielectric multilayer film preferably satisfies the following spectral characteristics:

(iv-1) an average reflectance $R_{D\_450\text{-}600AVE}$ in a spectral reflectance curve at the wavelength of 450 nm to 600 nm is 2% or less, and (iv-2) an average reflectance $R_{D\_1000\text{-}1200AVE}$ in a spectral reflectance curve at the wavelength of 1,000 nm to 1,200 nm is 40% or more.

A part of the near infrared light region of 700 nm to 1,000 nm needs to have transmittance to a certain degree. In consideration of the reflection characteristics of the dielectric multilayer film and the absorption characteristics of the near infrared ray absorbing pigment, the reflection characteristics of the dielectric multilayer film can be appropriately designed so as to achieve the target transmittance for the entire optical filter.

Examples of the NIR reflection layer include a dielectric film having a low refractive index (low refractive index film), a dielectric film having a medium refractive index (medium refractive index film), and a dielectric film having a high refractive index (high refractive index film), and the NIR reflection layer is composed of a dielectric multilayer film in which two or more of those dielectric films are laid. The high refractive index film preferably has a refractive index of 1.6 or more, and more preferably 2.2 to 2.5. Examples of a material of the high refractive index film include $Ta_2O_5$, $TiO_2$, $TiO_2$, TiO, and $Nb_2O_5$. Other commercial products thereof include OS50 ($Ti_3O_5$), OS10 ($Ti_4O_7$), OA500 (a mixture of $Ta_2O_5$ and $ZrO_2$), and OA600 (a mixture of $Ta_2O_5$ and $TiO_2$) manufactured by Canon Optron, Inc. Among those, $TiO_2$ is preferable from the viewpoint of reproducibility in film formability and refractive index, stability, and the like.

The medium refractive index film preferably has a refractive index of 1.6 or more and less than 2.2. Examples of a material of the medium refractive index film include $ZrO_2$, $Nb_2O_5$, $Al_2O_3$, $HfO_2$, OM-4 and OM-6 (mixtures of $Al_2O_3$ and $ZrO_2$) sold by Canon Optron, Inc., OA-100, and H4 and M2 (alumina lanthania) sold by Merck KGaA. Among those, $Al_2O_3$-based compounds and mixtures of $Al_2O_3$ and $ZrO_2$ are preferable from the viewpoint of reproducibility in film formability and refractive index, stability, and the like.

The low refractive index film preferably has a refractive index of less than 1.6, and more preferably 1.45 or more and less than 1.55. Examples of a material of the low refractive index film include $SiO_2$, $SiO_xN_y$, and $MgF_2$. Other commercial products thereof include S4F and S5F (mixtures of $SiO_2$ and $AlO_2$) manufactured by Canon Optron, Inc. Among those, $SiO_2$ is preferable from the viewpoint of reproducibility in film formability, stability, economic efficiency, and the like.

In order for the NIR reflection layer to transmit visible light and a specific near infrared light, several types of dielectric multilayer films having different spectral characteristics may be combined when transmitting and selecting a desired wavelength band.

For example, adjustment can be made according to a material constituting the film, a film thickness of each layer, and the number of layers.

In the NIR reflection layer, the total number of laid layers of the dielectric multilayer films constituting the reflection layer is preferably 20 or more, and more preferably 25 or more from the viewpoint of controlling a wavelength band subjected to transmission and light shielding, and is preferably 50 or less from the viewpoint of preventing a ripple.

In addition, the film thickness of the dielectric multilayer film is preferably 600 nm or more, and more preferably 1 μm or more from the viewpoint of preventing deterioration of the near infrared ray absorbing glass, and is preferably 5 μm or less from the viewpoint of productivity and prevention of a reflection ripple in the visible light region.

For formation of the dielectric multilayer film, for example, a vacuum film formation process such as a CVD method, a sputtering method, or a vacuum deposition method, a wet film formation process such as a spraying method or a dipping method, or the like can be used.

The NIR reflection layer may provide a predetermined optical characteristic by one layer (one group of dielectric multilayer films) or may provide a predetermined optical characteristic by two layers. When two or more NIR reflection layers are provided, the respective reflection layers may have the same configuration or different configurations. In a case where two or more reflection layers are provided, a plurality of reflection layers having different reflection bands are usually provided. In a case where two reflection layers are provided, one of the reflection layers may be a near infrared reflection layer that shields light in a short wavelength band in the near infrared region, and the other of the reflection layers may be a near infrared and near ultraviolet reflection layer that shields light in both a long wavelength band of the near infrared region and the near ultraviolet region.

Examples of the antireflection layer include a dielectric multilayer film, an intermediate refractive index medium, and a moth-eye structure in which the refractive index gradually changes. Among those, the dielectric multilayer film is preferable from the viewpoint of optical efficiency and productivity. The antireflection layer is obtained by alternately laminating a dielectric film having a high refractive index and a dielectric film having a low refractive index similarly to the reflection layer.

<Absorption Layer>

The filter includes an absorption layer having a maximum absorption wavelength in a near infrared light region on or above at least one surface of the above-mentioned dielectric multilayer film. Accordingly, the near infrared region can be efficiently shielded. In addition, since the absorption layer is laid via the dielectric multilayer film without being in contact with the near infrared ray absorbing glass, entry of water into the glass can be prevented.

The absorption layer preferably satisfies both the following spectral characteristics (ii-1) and (ii-2):

(ii-1) when a shortest wavelength at which an internal transmittance is 30% in a spectral transmittance curve at a wavelength of 650 nm to 720 nm is $\lambda_{A\_VIS(30\%)}$, and a shortest wavelength at which an internal transmittance is 30% in a spectral transmittance curve at a wavelength of 720 nm to 1,000 nm is $\lambda_{A\_IR(30\%)}$, the following relational expression is satisfied:

$$|\lambda_{A\_IR(30\%)}-\lambda_{A\_VIS(30\%)}|\geq 100 \text{ nm, and}$$

(ii-2) when an absorbance at a wavelength of 450 nm is $A_{A\_450}$ and an absorbance at a wavelength of 720 nm is $A_{A\_720}$, the following relational expression is satisfied:

$$A_{A\_720}-A_{A\_450}\geq 1.$$

The relational expression $|\lambda_{A\_IR(30\%)}-\lambda_{A\_VIS(30\%)}|$ in the characteristic (ii-1) is an index of a near infrared light absorption band centered at 720 nm, and being 100 nm or more means that the absorption layer absorbs a wide range of light in the region.

$|\lambda_{A\_IR(30\%)}-\lambda_{A\_VIS(30\%)}|$ is more preferably 120 nm or more. In addition, $|\lambda_{A\_IR(30\%)}-\lambda_{A\_VIS(30\%)}|$ is preferably 150 nm or less from the viewpoint that it is difficult to keep the transmittance of the visible light region high as the maximum absorption wavelength of the pigment is of a long wavelength region.

In order to satisfy the characteristic (ii-1), for example, a combination of two types of pigments having different maximum absorption wavelengths and existing in a range of 680 nm to 800 nm, preferably a combination of a pigment having a maximum absorption wavelength in 680 nm to 740 nm and a pigment having a maximum absorption wavelength in 740 nm to 800 nm may be used as the near infrared ray absorbing pigment. In addition, a squarylium pigment may be used from the viewpoint of achieving a wide range absorption with a small addition amount.

The characteristic (ii-2) means that the absorption layer achieves both a high visible light transmittance at 450 nm and a high near infrared light shielding property at 720 nm.

$A_{A\_720}-A_{A\_450}$ is preferably 1.5 or more, and more preferably 2 or more.

In order to satisfy the characteristic (ii-2), for example, a squarylium pigment of a symmetrical type may be used as the near infrared ray absorbing pigment from the viewpoint of strongly absorbing in the vicinity of 720 nm and maintaining a high transmittance in the visible light region.

The absorption layer preferably includes a pigment (NIR pigment) having a maximum absorption wavelength in 680 nm to 800 nm in dichloromethane. By including such a pigment, as shown in the above-mentioned characteristics (ii-1) and (ii-2), the absorption layer can absorb a wide range of light in the near infrared light absorption band centered at 720 nm, and can easily achieve both the visible light transmittance at 450 nm and the near infrared light shielding property at 720 nm. Accordingly, in a case of an infrared ray absorbing glass, the near infrared light region in the vicinity of 720 nm where the light shielding property is slightly weak can be shielded by the absorption characteristics of the pigment.

From the viewpoint of being able to absorb a wide range of light in the near infrared region, it is preferable to combine two types of pigments having different maximum absorption wavelengths and existing in a range of 680 nm to 800 nm, and preferably to combine a pigment having a maximum absorption wavelength in 680 nm to 740 nm and a pigment having a maximum absorption wavelength in 740 nm to 800 nm.

The absorption layer is preferably a resin film including the pigment and the resin.

Examples of the NIR pigment include a squarylium compound and a cyanine compound. Among those, a squarylium compound is preferable from the viewpoint of easily satisfying the above-mentioned characteristics (ii-1) and (ii-2), the viewpoint of transmittance in the maximum absorption wavelength region and the visible light region, solubility in a resin, and durability.

The squarylium compound as the NIR pigment is preferably a compound represented by the following formula (I) and a compound represented by the following formula (II).

When two or more identical symbols are present in the squarylium compound, the symbols may be the same or different. The same applies to the cyanine compound.

<Squarylium Compound (I)>

(I)

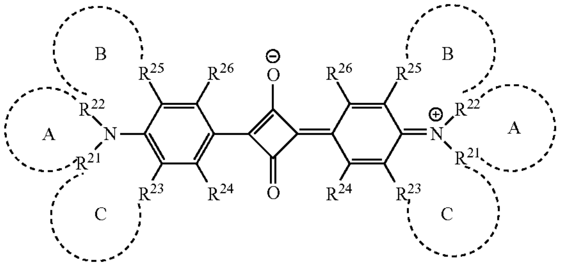

Here, symbols in the above-mentioned formula are as follows.

$R^{24}$ and $R^{26}$ each independently represent a hydrogen atom, a halogen atom, a hydroxyl group, an alkyl group or an alkoxy group having 1 to 20 carbon atoms, an acyloxy group having 1 to 10 carbon atoms, an aryl group having 6 to 11 carbon atoms, an alaryl group having 7 to 18 carbon atoms which may have a substituent and may have an oxygen atom between carbon atoms, —$NR^{27}R^{28}$ ($R^{27}$ and $R^{28}$ each independently represent a hydrogen atom, an alkyl group having 1 to 20 carbon atoms, —C(═O)—$R^{29}$ ($R^{29}$ is a hydrocarbon group having 1 to 25 carbon atoms which may have a hydrogen atom, a halogen atom, a hydroxyl group, or a substituent, and may have an unsaturated bond, an oxygen atom, or a saturated or unsaturated ring structure between carbon atoms), —$NHR^{30}$ or —$SO_2$—$R^{30}$ ($R^{30}$ is a hydrocarbon group having 1 to 25 carbon atoms in which one or more hydrogen atoms may be substituted with a halogen atom, a hydroxyl group, a carboxy group, a sulfo group, or a cyano group, and may have an unsaturated bond, an oxygen atom, or a saturated or unsaturated ring structure between carbon atoms)), or a group represented by the following formula (S) ($R^{41}$ and $R^{42}$ each independently represent a hydrogen atom, a halogen atom, or an alkyl group or an alkoxy group having 1 to 10 carbon atoms. K is 2 or 3).

(S)

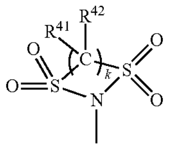

$R^{21}$ and $R^{22}$, $R^{22}$ and $R^{25}$, as well as $R^{21}$ and $R^{23}$ may each be linked to each other to respectively form a heterocycle A, a heterocycle B, and a heterocycle C, in which the number of members is 5 or 6 together with nitrogen atoms.

$R^{21}$ and $R^{22}$ in a case where the heterocycle A is formed represent, as a divalent group -Q- to which $R^{21}$ and $R^{22}$ are bonded, an alkylene group or an alkyleneoxy group in which a hydrogen atom may be substituted with an alkyl group having 1 to 6 carbon atoms, an aryl group having 6 to 10 carbon atoms, or an acyloxy group having 1 to 10 carbon atoms which may have a substituent.

$R^{22}$ and $R^{21}$ in a case where the heterocycle B is formed as well as $R^{21}$ and $R^{23}$ in a case where the heterocycle C is formed represent divalent groups —$X^1$—$Y^1$— and —$X^2$—$Y^2$— to which $R^{22}$ and $R^{25}$ as well as $R^{21}$ and $R^{23}$ are bonded (a side bonded to nitrogen is $X^1$ or $X^2$), each of $X^1$ and $X^2$ is a group represented by the following formula (1x) or (2x), and each of $Y^1$ and $Y^2$ is a group represented by any of those selected from the following formulae (1y) to (5y). In a case where each of $X^1$ and $X^2$ is a group represented by the following formula (2x), each of $Y^1$ and $Y^2$ may be a single bond, and may have an oxygen atom between carbon atoms in this case.

(1x)

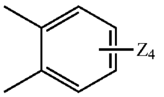

(2x)

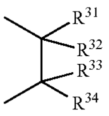

(1y)

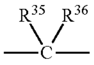

(2y)

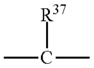

(3y)

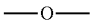

(4y)

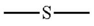

(5y)

In the formula (1x), four Zs each independently represent a hydrogen atom, a hydroxyl group, an alkyl group or an alkoxy group having 1 to 6 carbon atoms, or —$NR^{38}R^{39}$ ($R^{38}$ and $R^{39}$ each independently represent a hydrogen atom or an alkyl group having 1 to 20 carbon atoms). $R^{31}$ to $R^{36}$ each independently represent a hydrogen atom, an alkyl group having 1 to 6 carbon atoms, or an aryl group having 6 to 10 carbon atoms, and $R^{37}$ represents an alkyl group having 1 to 6 carbon atoms or an aryl group having 6 to 10 carbon atoms.

$R^{21}$ to $R^{23}$ and $R^{25}$ in a case where no heterocycle is formed, $R^{27}$, $R^{28}$, $R^{29}$, and $R^{31}$ to $R^{37}$ may be bonded to any other among those to form a 5-membered ring or a 6-membered ring. $R^{31}$ and $R^{36}$, as well as $R^{31}$ and $R^{37}$ may be directly bonded.

$R^{21}$, $R^{22}$, $R^{23}$, and $R^{25}$ in the case where no heterocycle is formed each independently represent a hydrogen atom, a halogen atom, a hydroxyl group, an alkyl group or an alkoxy group having 1 to 20 carbon atoms, an acyloxy group having 1 to 10 carbon atoms, an aryl group having 6 to 11 carbon atoms, or an alaryl group having 7 to 18 carbon atoms which may have a substituent and may have an oxygen atom between carbon atoms.

Examples of the compound (I) include a compound represented by any one of formulae (I-1) to (I-3), and the compound represented by the formula (I-1) is particularly preferable from the viewpoint of solubility in a resin, heat resistance and light resistance in a resin, and visible light transmittance of a resin layer containing the same.

(I-1)

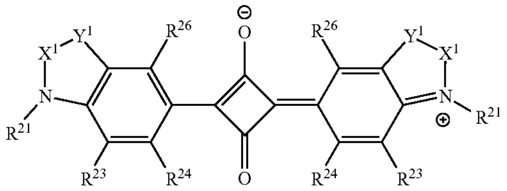

(I-2)

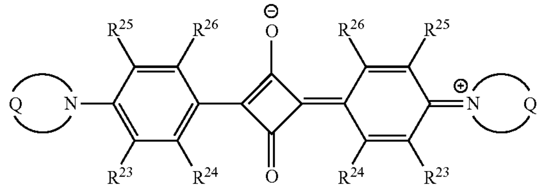

(I-3)

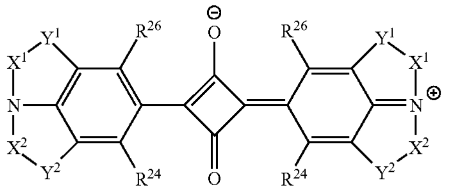

For symbols in the formulae (I-1) to (I-3), respective specifications thereof are the same as those for the same symbols in the formula (I), and preferred embodiments are also the same.

In the compound (I-1), $X^1$ is preferably a group (2x), and $Y^1$ is preferably a single bond or a group (1y). In this case. $R^{31}$ to $R^{36}$ are preferably hydrogen atoms or alkyl groups having 1 to 3 carbon atoms, and more preferably hydrogen atoms or methyl groups. Specific examples of $—Y^1—X^1$ include divalent organic groups represented by formulae (11-1) to (12-3).

$—C(CH_3)_2—CH(CH_3)—$ (11-1)

$—C(CH_3)_2—CH_2—$ (11-2)

$—C(CH_3)_2—CH(C_2H_5)—$ (11-3)

$—C(CH_3)_2—C(CH_3)(nC_3H_7)—$ (11-4)

$—C(CH_3)_2—CH_2—CH_2—$ (12-1)

$—C(CH_3)_2—CH_2—CH(CH_3)—$ (12-2)

$—C(CH_3)_2—CH(CH_3)—CH_2—$ (12-3)

In addition, in the compound (I-1), $R^{21}$ is independently more preferably a group represented by a formula (4-1) or (4-2) from the viewpoint of solubility, heat resistance, and further steepness of change in the vicinity of a boundary between the visible region and the near infrared region in a spectral transmittance curve.

(4-1)

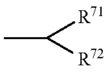

(4-2)

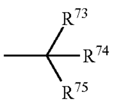

In the formulae (4-1) and (4-2), $R^{71}$ to $R^{75}$ independently represent a hydrogen atom, a halogen atom, or an alkyl group having 1 to 4 carbon atoms.

In the compound (I-1), $R^{24}$ is preferably $—NR^{27}R^{28}$. As $—NR^{27}R^{21}$, $—NH—C(=O)—R^{29}$ or $—NH—SO_2—R^{30}$ is preferable from the viewpoint of solubility in a resin and a coating solvent.

In the compound (I-1), a compound in which $R^{24}$ is $—NH—SO_2—R^{30}$ is shown in a formula (I-12).

(I-12)

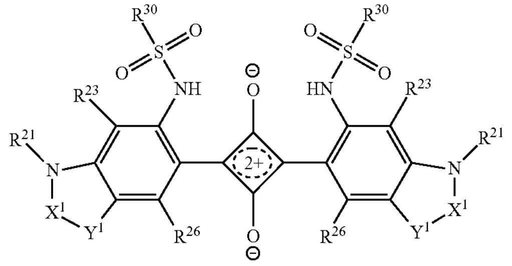

$R^{23}$ and $R^{26}$ are each independently preferably a hydrogen atom, a halogen atom, or an alkyl group or an alkoxy group having 1 to 6 carbon atoms, and both are more preferably a hydrogen atom.

From the viewpoint of light resistance, $R^{30}$ is independently preferably an alkyl group or an alkoxy group having 1 to 12 carbon atoms which may have a branch, or a hydrocarbon group having 6 to 16 carbon atoms which has an unsaturated ring structure. Examples of the unsaturated ring structure include benzene, toluene, xylene, furan, and benzofuran. $R^{30}$ is independently preferably an alkyl group or an alkoxy group having 1 to 12 carbon atoms which may have a branch. In addition, in each group representing $R^{30}$, some or all of hydrogen atoms may be substituted with halogen atoms, particularly fluorine atoms.

More specific examples of the compound (I-12) include compounds shown in the following table. In addition, in the compounds shown in the following table, meanings of respective symbols are the same on the left and right sides of a squarylium skeleton.

TABLE 1

| Pigment | Substituent | | | | |
|---|---|---|---|---|---|
| abbreviation | $—Y^1—X^1—$ | $R^{21}$ | $R^{30}$ | $R^{23}$ | $R^{26}$ |
| (I-12-1) | (11-1) | $—CH_3$ | $—C_8H_{17}$ | H | H |
| (I-12-2) | (11-1) | $—CH_3$ | $—CH(CH_3)(nC_3H_7)$ | H | H |
| (I-12-3) | (11-1) | $—CH_3$ | $—CH(C_2H_5)(nC_4H_9)$ | H | H |
| (I-12-4) | (11-1) | $—CH_3$ | $—CH(nC_3H_7)_2$ | H | H |
| (I-12-5) | (11-1) | $—CH_3$ | $—C(CH_3)_2(nC_3H_7)$ | H | H |
| (I-12-6) | (11-1) | $—C_2H_5$ | $-nC_8H_{17}$ | H | H |
| (I-12-7) | (11-1) | $—C_2H_5$ | $—CH(CH_3)(nC_3H_7)$ | H | H |
| (I-12-8) | (11-1) | $—C_2H_5$ | $—CH(C_2H_5)(nC_4H_9)$ | H | H |
| (I-12-9) | (11-1) | $—C_2H_5$ | $—CH(nC_3H_7)_2$ | H | H |
| (I-12-10) | (11-1) | $—C_2H_5$ | $—C(CH_3)_2(nC_3H_7)$ | H | H |
| (I-12-11) | (11-1) | $—CH(CH_3)_2$ | $-nC_8H_{17}$ | H | H |
| (I-12-12) | (11-1) | $—CH(CH_3)_2$ | $—CH(CH_3)(nC_3H_7)$ | H | H |
| (I-12-13) | (11-1) | $—CH(CH_3)_2$ | $—CH(C_2H_5)(nC_4H_9)$ | H | H |
| (I-12-14) | (11-1) | $—CH(CH_3)_2$ | $—CH(nC_3H_7)_2$ | H | H |
| (I-12-15) | (11-1) | $—CH(CH_3)_2$ | $—C(CH_3)_2(nC_3H_7)$ | H | H |
| (I-12-16) | (11-4) | $—CH_3$ | $-nC_8H_{17}$ | H | H |
| (I-12-17) | (11-4) | $—CH_3$ | $—CH(CH_3)(nC_3H_7)$ | H | H |
| (I-12-18) | (11-4) | $—CH_3$ | $—CH(C_2H_5)(nC_4H_9)$ | H | H |
| (I-12-19) | (11-4) | $—CH_3$ | $—CH(nC_3H_7)_2$ | H | H |
| (I-12-20) | (11-4) | $—CH_3$ | $—C(CH_3)_2(nC_3H_7)$ | H | H |
| (I-12-21) | (11-4) | $—C_2H_5$ | $-nC_8H_{17}$ | H | H |
| (I-12-22) | (11-4) | $—C_2H_5$ | $—CH(CH_3)(nC_3H_7)$ | H | H |
| (I-12-23) | (11-4) | $—C_2H_5$ | $—CH(C_2H_5)(nC_4H_9)$ | H | H |
| (I-12-24) | (11-4) | $—C_2H_5$ | $—CH(nC_3H_7)_2$ | H | H |
| (I-12-25) | (11-4) | $—C_2H_5$ | $—C(CH_3)_2(nC_3H_7)$ | H | H |
| (I-12-26) | (11-4) | $—CH(CH_3)_2$ | $-nC_8H_{17}$ | H | H |
| (I-12-27) | (11-4) | $—CH(CH_3)_2$ | $—CH(CH_3)(nC_3H_7)$ | H | H |
| (I-12-28) | (11-4) | $—CH(CH_3)_2$ | $—CH(C_2H_5)(nC_4H_9)$ | H | H |
| (I-12-29) | (11-4) | $—CH(CH_3)_2$ | $—CH(nC_3H_7)_2$ | H | H |
| (I-12-30) | (11-4) | $—CH(CH_3)_2$ | $—C(CH_3)_2(nC_3H_7)$ | H | H |

The compound (I-12) is, among these compounds, preferably at least one of (I-12-1), (I-12-6), (I-12-11), (I-12-16), (I-12-21), and (I-12-26) from the viewpoint of visible transmittance, solubility in a resin, heat resistance, and light resistance, and more preferably at least one of (I-12-11) and (I-12-26) from the viewpoint of heat resistance and light resistance.

<Squarylium Compound (II)>

(II)

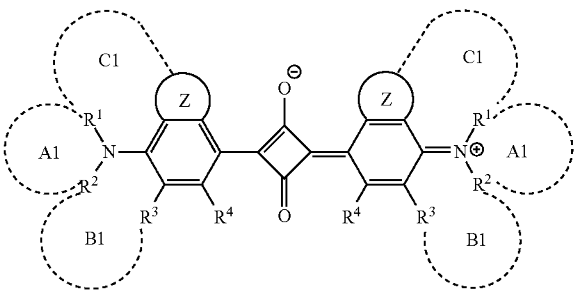

Here, symbols in the above-mentioned formula are as follows.

Each ring Z is independently a 5-membered ring or a 6-membered ring having 0 to 3 heteroatoms in the ring, and a hydrogen atom of the ring Z may be substituted.

Carbon atoms or heteroatoms constituting $R^1$ and $R^2$, $R^2$ and $R^3$, as well as $R^1$ and the ring Z may be linked to each other to respectively form a heterocyclic ring A1, a heterocyclic ring B1, and a heterocyclic ring C1 together with a nitrogen atom, and in this case, the hydrogen atoms of the heterocyclic ring A1, the heterocyclic ring B1, and the heterocyclic ring C1 may be substituted. $R^1$ and $R^2$ in a case where no heterocyclic ring is formed each independently represent a hydrogen atom, a halogen atom, or a hydrocarbon group which may have an unsaturated bond, a heteroatom, a saturated or unsaturated ring structure between carbon atoms and may have a substituent. $R^3$ in the case where no heterocyclic ring is formed and $R^4$ each independently represent a hydrogen atom, a halogen atom, or an alkyl group or an alkoxy group which may have a heteroatom between carbon atoms and may have a substituent.

Examples of the compound (II) include a compound represented by any one of formulae (II-1) to (II-3), and a compound represented by the formula (II-3) is particularly preferable from the viewpoint of solubility in a resin and visible light transmittance in a resin.

(II-1)

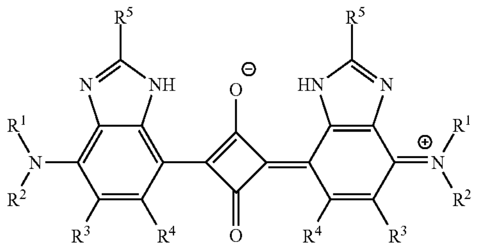

(II-2)

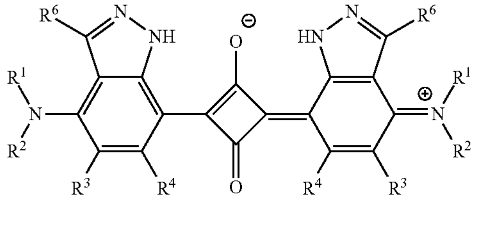

-continued (II-3)

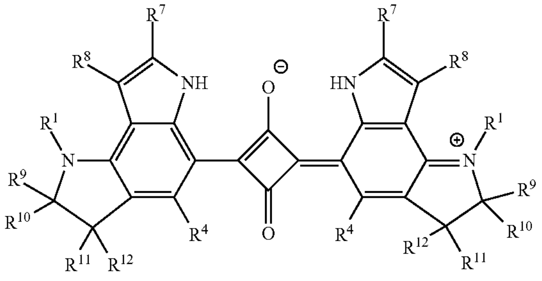

In the formulae (II-1) and (II-2), $R^1$ and $R^2$ each independently represent a hydrogen atom, a halogen atom, or an alkyl group having 1 to 15 carbon atoms which may have a substituent, and $R^3$ to $R^6$ each independently represent a hydrogen atom, a halogen atom, or an alkyl group having 1 to 10 carbon atoms which may have a substituent.

In the formula (II-3), $R^1$, $R^4$, and $R^9$ to $R^{12}$ each independently represent a hydrogen atom, a halogen atom, or an alkyl group having 1 to 15 carbon atoms which may have a substituent, and $R^7$ and $R^8$ each independently represent a hydrogen atom, a halogen atom, or an alkyl group having 1 to 5 carbon atoms which may have a substituent.

Regarding $R^1$ and $R^2$ in the compound (II-1) and the compound (II-2), from the viewpoint of solubility in a resin, visible light transmittance, and the like, it is preferable that $R^1$ and $R^2$ be independently alkyl groups having 1 to 15 carbon atoms, it is more preferable that $R^1$ and $R^2$ be alkyl groups having 7 to 15 carbon atoms, it is further preferably at least one of $R^1$ and $R^2$ be an alkyl group having a branched chain having 7 to 15 carbon atoms, and it is particularly preferable that both $R^1$ and $R^2$ be alkyl groups having a branched chain and having 8 to 15 carbon atoms.

$R^1$ in the compound (II-3) is independently preferably an alkyl group having 1 to 15 carbon atoms, more preferably an alkyl group having 1 to 10 carbon atoms, and particularly preferably an ethyl group or an isopropyl group, from the viewpoint of solubility in a transparent resin, visible light transmittance, and the like.

$R^4$ is preferably a hydrogen atom or a halogen atom, and particularly preferably a hydrogen atom, from the viewpoint of visible light transmittance and ease of synthesis.

$R^7$ and $R^8$ are independently preferably a hydrogen atom, a halogen atom, or an alkyl group having 1 to 5 carbon atoms which may be substituted with a halogen atom, and more preferably a hydrogen atom, a halogen atom, or a methyl group.

$R^9$ to $R^{12}$ are independently preferably a hydrogen atom, a halogen atom, or an alkyl group having 1 to 5 carbon atoms which may be substituted with a halogen atom.

Examples of $—CR^9R^{10}—CR^{11}R^{12}—$ include divalent organic groups represented by the following groups (13-1) to (13-5).

$$—CH(CH_3)—C(CH_3)_2— \quad (13\text{-}1)$$

$$—C(CH_3)_2—CH(CH_3)— \quad (13\text{-}2)$$

$$—C(CH_3)_2—CH_2— \quad (13\text{-}3)$$

$$—C(CH_3)_2—CH(C_2H_5)— \quad (13\text{-}4)$$

$$—CH(CH_3)—C(CH_3)(CH_2—CH(CH_3)_2)— \quad (13\text{-}5)$$

More specific examples of the compound (II-3) include compounds shown in the following table. In addition, in the compounds shown in the following table, meanings of respective symbols are the same on the left and right sides of a squarylium skeleton.

TABLE 2

| Pigment | Substituent | | | | |
|---|---|---|---|---|---|
| abbreviation | $—CR^9R^{10}—CR^{11}R^{12}—$ | $R^1$ | $R^4$ | $R^7$ | $R^8$ |
| (II-3-1) | (13-1) | $—C_2H_5$ | H | H | H |
| (II-3-2) | (13-5) | $—C_2H_5$ | H | H | H |
| (II-3-3) | (13-1) | $—CH(CH_3)_2$ | H | H | $—CH_3$ |

The compounds (I) and (II) can each be produced by known methods. The compound (I) can be produced by methods disclosed in U.S. Pat. No. 5,543,086, U.S. Patent Application Publication No. 2014/0061505, and WO2014/088063. The compound (II) can be produced by a method disclosed in WO2017/135359.

A content of a NIR pigment in the absorption layer is preferably 0.1 parts by mass to 25 parts by mass, and more preferably 0.3 parts by mass to 15 parts by mass with respect to 100 parts by mass of the resin. In a case where two or more compounds are combined, the above-mentioned content is a sum of respective compounds.

The absorption layer may include other pigments in addition to the above-mentioned NIR pigment. Examples of the other pigments preferably include a pigment (UV pigment) having a maximum absorption wavelength in 370 nm to 440 nm in the resin. Accordingly, the near ultraviolet region can be efficiently shielded.

Examples of the UV pigment include an oxazole pigment, a merocyanine pigment, a cyanine pigment, a naphthalimide pigment, an oxadiazole pigment, an oxazine pigment, an oxazolidine pigment, a naphthalic acid pigment, a styryl pigment, an anthracene pigment, a cyclic carbonyl pigment, and a triazole pigment. Among those, the merocyanine pigment is particularly preferable. In addition, these pigments may be used alone, or may be used in combination of two or more types thereof.

<Resin>

The resin in the absorption layer is not limited as long as it is a transparent resin, and one or more kinds of transparent resins selected from a polyester resin, an acrylic resin, an epoxy resin, an ene-thiol resin, a polycarbonate resin, a polyether resin, a polyarylate resin, a polysulfone resin, a polyethersulfone resin, a poly(p-phenylene) resin, a polyarylene ether phosphine oxide resin, a polyamide resin, a polyimide resin, a polyamide-imide resin, a polyolefin resin, a cyclic olefin resin, a poly urethane resin, a polystyrene resin, and the like are used. These resins may be used alone, or may be used by mixing two or more kinds thereof.

From the viewpoint of spectral characteristics, glass transition point (Tg), and adhesion of the absorption layer, one or more kinds of resins selected from a polyimide resin, a polycarbonate resin, a polyester resin, and an acrylic resin are preferable.

In a case where a plurality of compounds are used as the NIR pigment or other pigments, those compounds may be included in the same absorption layer or may be included in different absorption layers.

The absorption layer can be formed by dissolving or dispersing a pigment, a resin or raw material components of the resin, and respective components blended as necessary in a solvent to prepare a coating solution, applying the coating solution to a dielectric multilayer film, drying the coating solution, and further curing the coating solution as necessary. Alternatively, the absorption layer may be separately formed by applying the coating solution to a peelable support. In addition, the solvent may be a dispersion medium capable of stably dispersing or a solvent capable of dissolving.

In addition, the coating solution may contain a surfactant in order to improve voids due to fine bubbles, depressions due to adhesion of foreign substances and the like, and repelling in a drying process. Further, for the application of the coating solution, for example, a dip coating method, a cast coating method, or a spin coating method can be used. In addition, in a case where the coating solution contains a raw material component of the transparent resin, a curing process such as thermal curing or photocuring is further performed.

The absorption layer can also be manufactured into a film shape by extrusion molding. The filter can be manufactured by laminating the obtained film-shaped absorption layer on a dielectric multilayer film and integrating those by thermal press fitting or the like.

The absorption layer may be provided in the optical filter by one layer or two or more layers. In a case where the absorption layer is provided by two or more layers, each of the layers may have the same configuration or a different configuration, and two or more layers may be stacked on or above one surface of the dielectric multilayer film even when the absorption layers are formed on or above each of the surfaces of the dielectric multilayer films.

A thickness of the absorption layer is 10 μm or less and preferably 5 μm or less from the viewpoint of in-plane film thickness distribution in a substrate and appearance quality after coating, and is preferably 0.5 μm or more from the viewpoint of exhibiting desired spectral characteristics at an appropriate pigment concentration. In a case where the optical filter has two or more layers of absorption layers, a total thickness of each of the absorption layers is preferably within the above-mentioned range.

The filter may include, as another component, for example, a component (layer) that provides absorption by inorganic fine particles or the like that control transmission and absorption of light in a specific wavelength region. Specific examples of the inorganic fine particles include indium tin oxides (ITO), antimony-doped tin oxides (ATO), cesium tungstate, and lanthanum boride. The ITO fine particles and the cesium tungstate fine particles have high visible light transmittance and have light absorbing property in a wide range of an infrared wavelength region exceeding 1,200 nm, and thus can be used in a case where shielding property of infrared light is required.

From the above, the present description discloses the following optical filters and the like.

[1] An optical filter, including:

a near infrared ray absorbing glass, dielectric multilayer films laid on or above both major surfaces of the near infrared ray absorbing glass, and an absorption layer laid on or above a surface of at least one of the dielectric multilayer films and having a maximum absorption wavelength in a near infrared light region, in which the optical filter satisfies all of the following spectral characteristics (i-1) to (i-5):

(i-1) in a spectral transmittance curve at a wavelength of 450 nm to 60) nm and an incident angle of 0 degrees, an average transmittance $T_{450\text{-}600(0deg)AVE}$ is 60% or more, (i-2) in a spectral transmittance curve at a wavelength of 700 nm to 750 nm and an incident angle of 0 degrees, an average transmittance $T_{700\text{-}750(0deg)AVE}$ is 5% or less, (i-3) in a spectral transmittance curve at a wavelength of 1,050 nm to 1,200 nm and an incident angle of 0 degrees, a maximum transmittance $T_{1050\text{-}1200(0deg)MAX}$ is 7% or less, (i-4) in a spectral transmittance curve at a wavelength of 800 nm to 1,000 nm and an incident angle of 0 degrees, a maximum transmittance $T_{800\text{-}1000(0deg)MAX}$ is 20% or more, and (i-5) when a maximum transmittance in the spectral transmittance curve at a wavelength of 450 nm to 600 nm and an incident angle of 0 degrees is $T_{450\text{-}600(0deg)MAX}$, in the spectral transmittance curve at an incident angle of 0 degrees, a wavelength $\lambda_{(70\%)}$ at which a transmittance is 70% of $T_{450\text{-}600(0deg)MAX}$ and a wavelength 30 at which a transmittance is 30% of $T_{450\text{-}600(0deg)MAX}$ are included in a range of 600 nm to 700 nm, and when the transmittance at the wavelength $\lambda_{(70\%)}$ is $T_{(70\%)}$ and the transmittance at the wavelength $\lambda_{(30\%)}$ is $T_{(30\%)}$, the following relational expression is satisfied:

$$-2 \leq [T_{(30\%)} - T_{(70\%)}]/[\lambda_{(30\%)} - \lambda_{(70\%)}] \leq -0.75.$$

[2] The optical filter according to [1], in which the optical filter further satisfies the following spectral characteristic (i-6):

(i-6) when a transmittance at a wavelength λ in a spectral transmittance curve at an incident angle of 0 degrees is $T_{(0deg)}(\lambda)$ and a transmittance at the wavelength λ in a spectral transmittance curve at an incident angle of 35 degrees is $T_{(35deg)}(\lambda)$, the following relational expression is satisfied in a wavelength range of 450 nm≤λ≤600 nm:

$$|T_{(0deg)}(\lambda) - T_{(35deg)}(\lambda)| \leq 10\%$$

[3] The optical filter according to [1] or [2], in which the optical filter further satisfies the following spectral characteristic (i-7):

(i-7) when the maximum transmittance in the spectral transmittance curve at a wavelength of 450 nm to 600 nm and an incident angle of 0 degrees is $T_{450\text{-}600(0deg)MAX}$, a wavelength $\lambda_{VIS(0deg)(50\%)}$ at which $T_{450\text{-}600(0deg)MAX}$ is 50% at an incident angle of 0 degrees and a wavelength $\lambda_{VIS(35deg)(50\%)}$ at which $T_{450\text{-}600(0deg)MAX}$ is 50% at an incident angle of 35 degrees are included in a range of 600 nm to 700 nm, and the following relational expression is satisfied:

$$|\lambda_{VIS(0deg)(50\%)} - \lambda_{VIS(35deg)(50\%)}| \leq 10 \text{ nm}.$$

[4] The optical filter according to any one of [1] to [3], in which the optical filter further satisfies the following spectral characteristic (i-8):

(i-8) in the spectral transmittance curve at a wavelength of 800 nm to 1,000 nm and an incident angle of 0 degrees, when the maximum transmittance is $T_{800\text{-}1000(0deg)MAX}$ and a wavelength at which the maximum transmittance is obtained is $\lambda_{800\text{-}1000(0deg)MAX}$, a wavelength $\lambda_{IRS(0deg)(50\%)}$ at which a transmittance is 50% of $T_{800\text{-}1000(0deg)MAX}$ in a spectral transmittance curve in a range of 750 nm to $\lambda_{800\text{-}1000(0deg)MAX}$ nm and at an incident angle of 0 degrees, and a wavelength $\lambda_{IRS(35deg)(50\%)}$ at which a transmittance is 50% of $T_{800\text{-}1000(0deg)MAX}$ in a spectral transmittance curve in the range of 750 nm to $\lambda_{800\text{-}1000(0deg)MAX}$ nm and at an incident angle of 35 degrees satisfy the following relational expression:

$$|\lambda_{IRS(0deg)(50\%)}-\lambda_{IRS(35deg)(50\%)}|\leq 30 \text{ nm}.$$

[5] The optical filter according to any one of [1] to [4], in which the optical filter further satisfies the following spectral characteristic (i-9):

(i-9) in the spectral transmittance curve at a wavelength of 800 nm to 1,000 nm and an incident angle of 0 degrees, when the maximum transmittance is $T_{800\text{-}1000(0deg)MAX}$ and a wavelength at which the maximum transmittance is obtained is $\lambda_{800\text{-}1000(0deg)MAX}$, a wavelength $\lambda_{IRL(0deg)(50\%)}$ at which a transmittance is 50% of $T_{800\text{-}1000(0deg)MAX}$ in a spectral transmittance curve in a range of $\lambda_{800\text{-}1000(0deg)MAX}$ nm to 1,050 nm and at an incident angle of 0 degrees, and a wavelength $\lambda_{IRL(35deg)(50\%)}$ at which a transmittance is 50% of $T_{800\text{-}1000(0deg)MAX}$ in a spectral transmittance curve in the range of $\lambda_{800\text{-}1000(0deg)MAX}$ nm to 1,050 nm and at an incident angle of 35 degrees satisfy the following relational expression:

$$|\lambda_{IRL(0deg)(50\%)}-\lambda_{IRL(35deg)(50\%)}|\leq 60 \text{ nm}.$$

[6] The optical filter according to any one of [1] to [5], in which each of the dielectric multilayer films laid on or above the both major surfaces of the near infrared ray absorbing glass has a thickness of 600 nm or more.

[7] The optical filter according to any one of [1] to [6], in which the near infrared ray absorbing glass is a fluorophosphate glass containing iron or copper or a phosphate glass containing iron or copper.

[8] The optical filter according to any one of [1] to [7], in which the near infrared ray absorbing glass satisfies all of the following spectral characteristics (iii-1) to (iii-3):

(iii-1) an average internal transmittance $T_{G\_450\text{-}600AVE}$ in a spectral transmittance curve at the wavelength of 450 nm to 600 nm is 80% or more, (iii-2) an average internal transmittance $T_{G\_1050\text{-}1200AVE}$ in a spectral transmittance curve at the wavelength of 1,050 nm to 1,200 nm is lower than the average internal transmittance $T_{G\_450\text{-}600AVE}$, and (iii-3) an internal transmittance $T_{G\_800\text{-}1000}$ at the wavelength of 800 nm to 1,000 nm monotonically decreases.

[9] The optical filter according to any one of [1] to [8], in which the absorption layer includes a pigment having a maximum absorption wavelength in 680 nm to 800 nm in dichloromethane.

[10] The optical filter according to any one of [1] to [9], in which the optical filter further satisfies the following spectral characteristics (i-10) and (i-11):

(i-10) in a spectral reflectance curve at an incident angle of 5 degrees on at least one of surfaces, an average reflectance $R_{450\text{-}600(5deg)AVE}$ at the wavelength of 450 nm to 600 nm is 15% or less, and (i-11) in the spectral reflectance curve at an incident angle of 5 degrees on at least one of surfaces, an average reflectance $R_{1050\text{-}1200(5deg)AVE}$ at the wavelength of 1,050 nm to 1,200 nm is 40% or more.

[11] The optical filter according to any one of [1] to [10], in which the absorption layer satisfies both the following spectral characteristics (ii-1) and (ii-2):

(ii-1) when a shortest wavelength at which an internal transmittance is 30% in a spectral transmittance curve at a wavelength of 650 nm to 720 nm is $\lambda_{A\_VIS(30\%)}$, and a shortest wavelength at which an internal transmittance is 30% in a spectral transmittance curve at a wavelength of 720 nm to 1,000 nm is $\lambda_{A\_IR(30\%)}$, the following relational expression is satisfied:

$$|\lambda_{A\_IR(30\%)}-\lambda_{A\_VIS(30\%)}|\geq 100 \text{ nm, and}$$

(ii-2) when an absorbance at a wavelength of 450 nm is $A_{A\_450}$ and an absorbance at a wavelength of 720 nm is $A_{A\_720}$, the following relational expression is satisfied:

$$A_{A\_720}-A_{A\_450}\geq 1.$$

[12] An imaging device including the optical filter according to any one of [1] to [11].

EXAMPLES

Next, the present invention will be described more specifically with reference to examples.

For measurement of each spectral characteristic, an ultraviolet-visible spectrophotometer (UH-4150 type, manufactured by Hitachi High-Tech Corporation) was used.

The spectral characteristic in a case where an incident angle is not particularly specified is a value measured at an incident angle of 0 degrees (in a direction perpendicular to a major surface of an optical filter).

Pigments used in respective examples are as follows.

Compound 1 (squarylium compound): synthesized based on U.S. Pat. No. 5,543,086, U.S. Patent Application Publication No. 2014/0061505, and WO2014/088063.

Compound 2 (squarylium compound): synthesized based on WO2017/135359.

Compound 3 (merocyanine compound): synthesized based on the description of German Patent No. 10109243.

Compound 4 (merocyanine compound): synthesized based on the description of German Patent No. 10109243.

The compound 1 and the compound 2 are near infrared ray absorbing pigments (NIR pigments), and the compound 3 and the compound 4 are near ultraviolet absorbing pigments (UV pigments).

COMPOUND 1

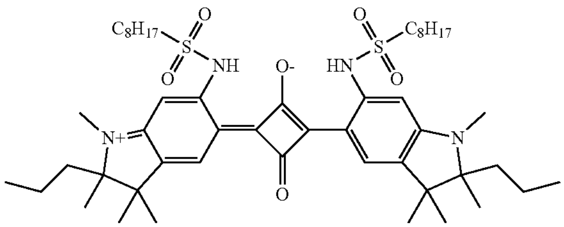

COMPOUND 2

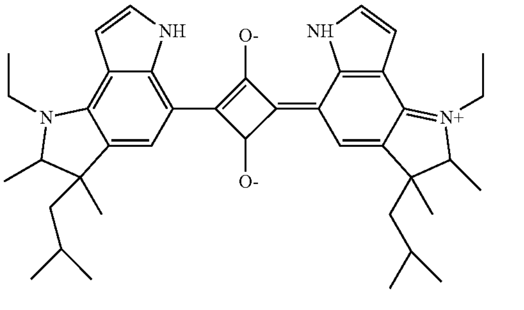

-continued

COMPOUND 3

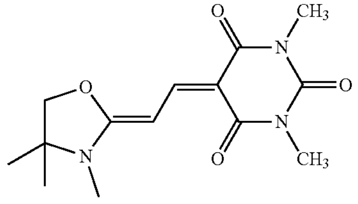

COMPOUND 4

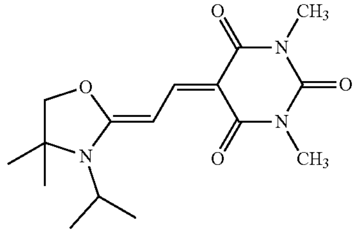

<Spectral Characteristics of Pigment>

Maximum absorption wavelengths in absorption spectrums measured after respectively dissolving the above-mentioned pigments (compounds 1 to 4) in dichloromethane are shown.

TABLE 3

| Pigment | Maximum absorption wavelength (in dichloromethane) |
|---|---|
| Compound 1 | 698 nm |
| Compound 2 | 742 nm |
| Compound 3 | 397 nm |
| Compound 4 | 399 nm |

<Spectral Characteristics of Near Infrared Ray Absorbing Glass>

As the near infrared ray absorbing glass, iron phosphate glasses having compositions shown in the following table was manufactured with reference to WO2020/262296.

With respect to the near infrared ray absorbing glasses, a spectral transmittance curve in the wavelength range of 350 nm to 1,200 nm was measured using an ultraviolet-visible spectrophotometer.

Results are shown in the following table. The spectral characteristics shown in the following table were evaluated in terms of an internal transmittance in order to avoid an influence of reflection at an air interface and a glass interface.

$$\text{Internal transmittance (\%)}=\{\text{measured transmittance}_{(0deg)}/(100-\text{reflectance}_{(5deg)})\}\times 100$$

Figure 3:
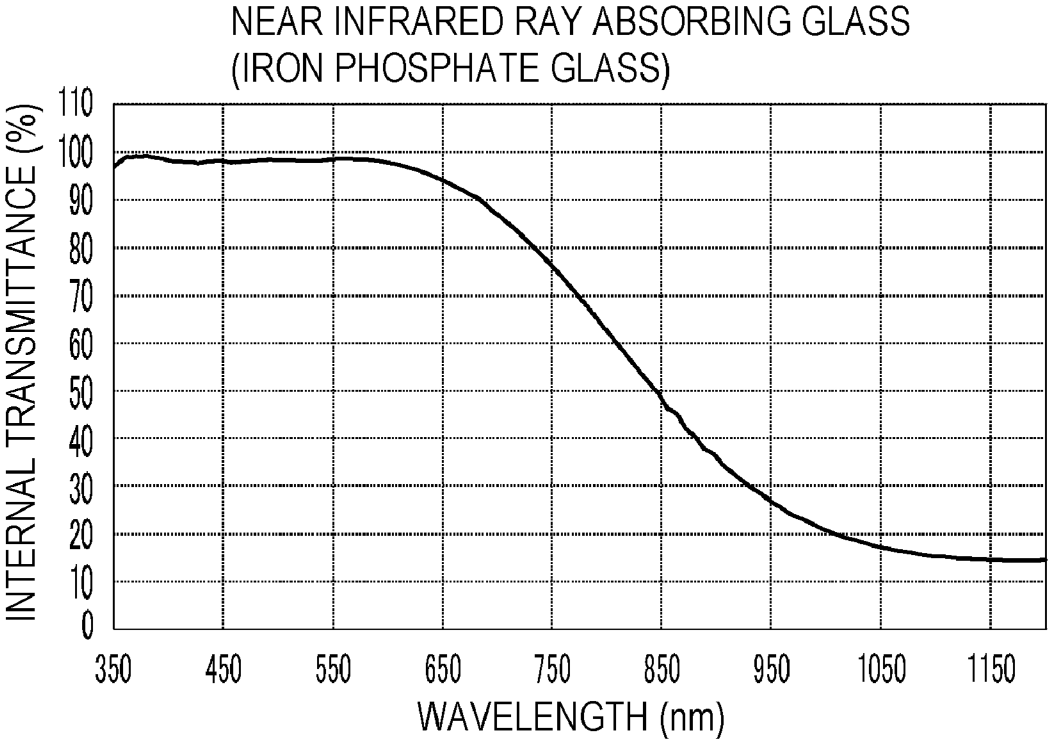
FIG. 3 is a diagram illustrating a spectral transmittance curve of a near infrared ray absorbing glass.

In addition, a spectral transmittance curve of the near infrared ray absorbing glass (iron phosphate glass having a thickness of 0.21 mm) is illustrated in FIG. 3.

TABLE 4

| | | Glass | |
|---|---|---|---|
| Near infrared ray absorbing glass | Type | Iron phosphate | |
| | Thickness | 0.21 mm | 0.16 mm |
| Glass composition (mol %) | $P_2O_5$ | 63 | |
| | $Al_2O_3$ | 17 | |
| | $K_2O$ | 1 | |
| | BaO | 2 | |
| | ZnO | 9 | |
| | $Fe_2O_3$ | 8 | |
| Spectral characteristics | TG_450-600AVE (%) | 98.2 | 98.7 |
| | TG_1050-1200AVE (%) | 15.2 | 23.6 |
| | TG_800 (%) | 62.8 | 70.1 |
| | TG_900 (%) | 36.2 | 45.8 |
| | TG_1000 (%) | 20.8 | 30.0 |

Examples 1-1 and 1-2: Spectral Characteristics of Absorption Layer

Any of the pigments of the compounds 1 to 4 were mixed with a polyimide resin solution prepared in the same manner as in calculation of the spectral characteristics of the above-mentioned compounds at a concentration shown in the following table, and stirred and dissolved at 50° C. for 2 hours to obtain a coating solution. The obtained coating solution was applied onto an alkaline glass (D263 glass, manufactured by SCHOTT, thickness: 0.2 mm) by a spin coating method to form an absorption layer having a film thickness shown in the following table.

With respect to the obtained absorption layer, a spectral transmittance curve in a wavelength range of 350 nm to 1,200 nm was measured using an ultraviolet-visible spectrophotometer.

Results when a transmittance at the maximum absorption wavelength matches 10% are shown in the following table.

The spectral characteristics shown in the following table were evaluated in terms of an internal transmittance in order to avoid an influence of reflection at an air interface and a glass interface.

$$\text{Internal transmittance (\%)}=\{\text{measured transmittance}_{(0deg)}/(100-\text{reflectance}_{(5deg)})\}\times 100$$

The absorbance represents a value converted from the internal transmittance by the following formula.

$$\text{Absorbance}=-\log_{10}(\text{internal transmittance}/100)$$

Figure 4:
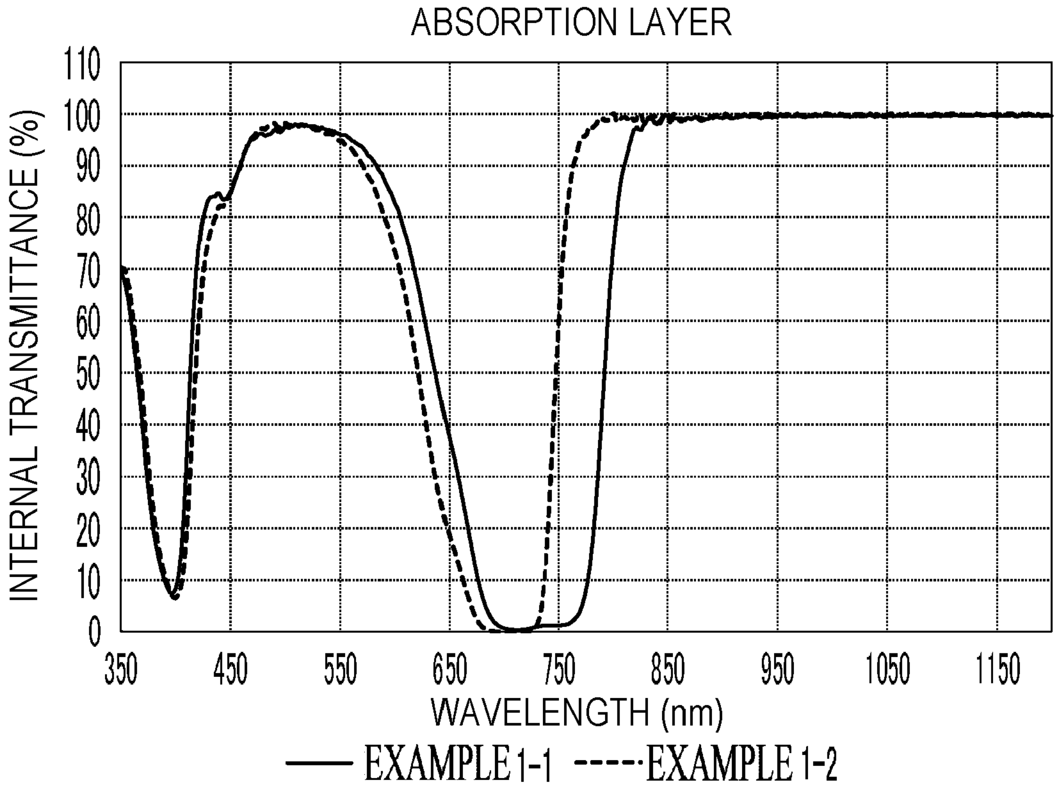
FIG. 4 is a diagram illustrating spectral transmittance curves of absorption layers of Examples 1-1 and 1-2.
Figure 5:
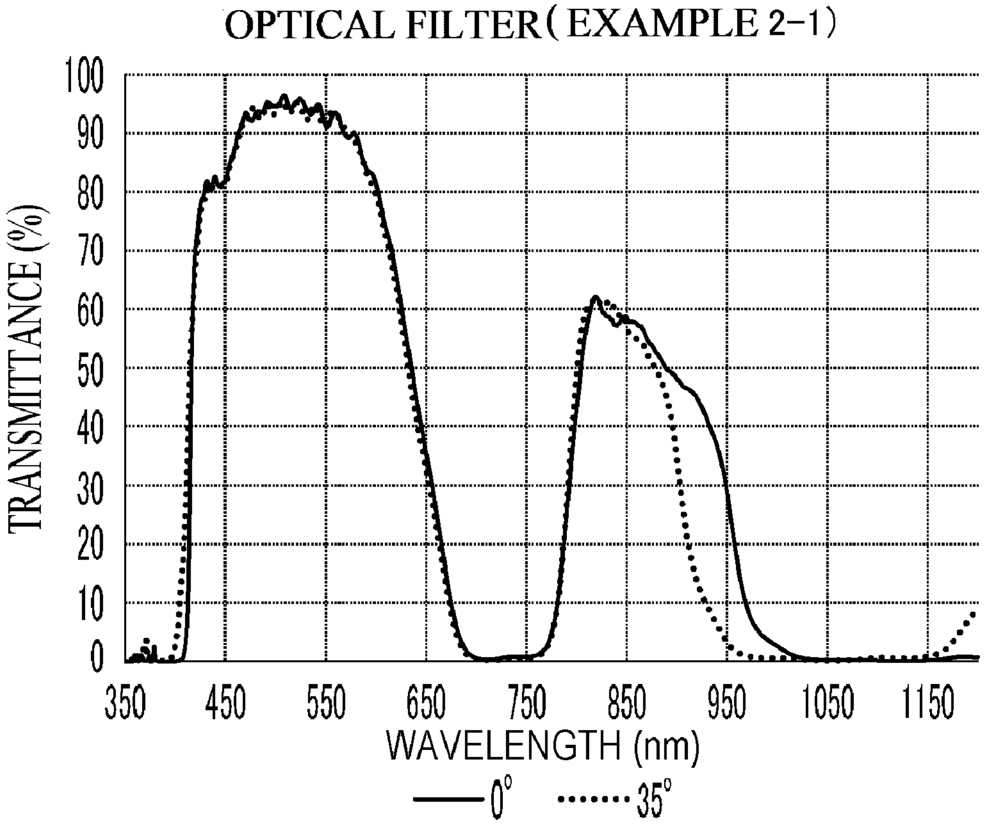
FIG. 5 is a diagram illustrating spectral transmittance curves of an optical filter of Example 2-1.
Figure 6:
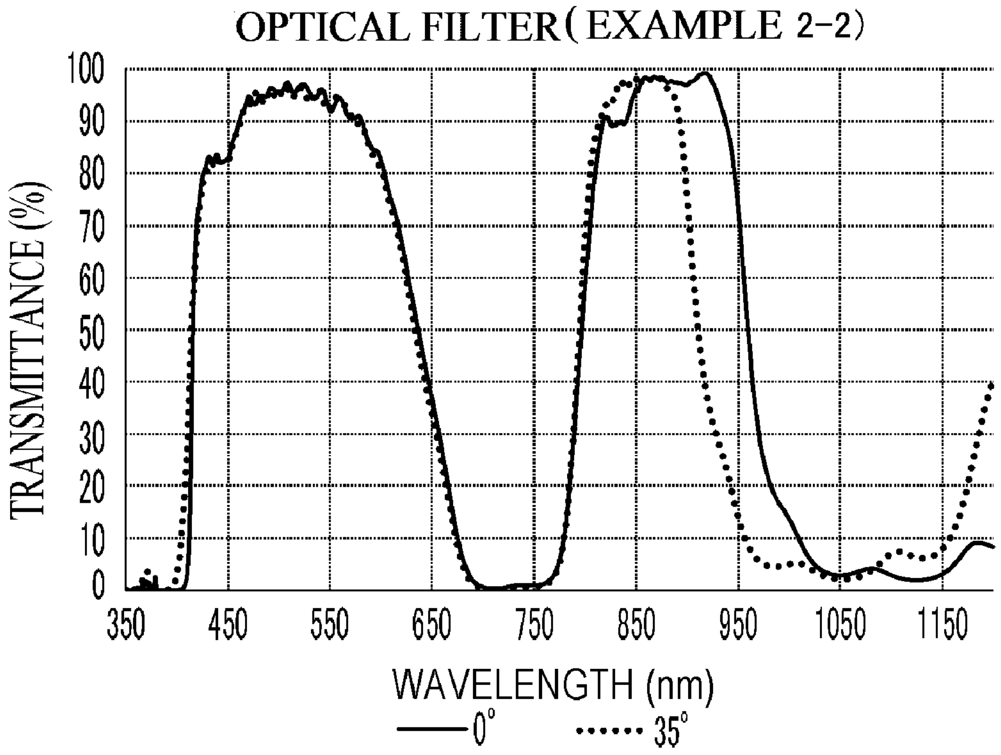
FIG. 6 is a diagram illustrating spectral transmittance curves of an optical filter of Example 2-2.
Figure 7:
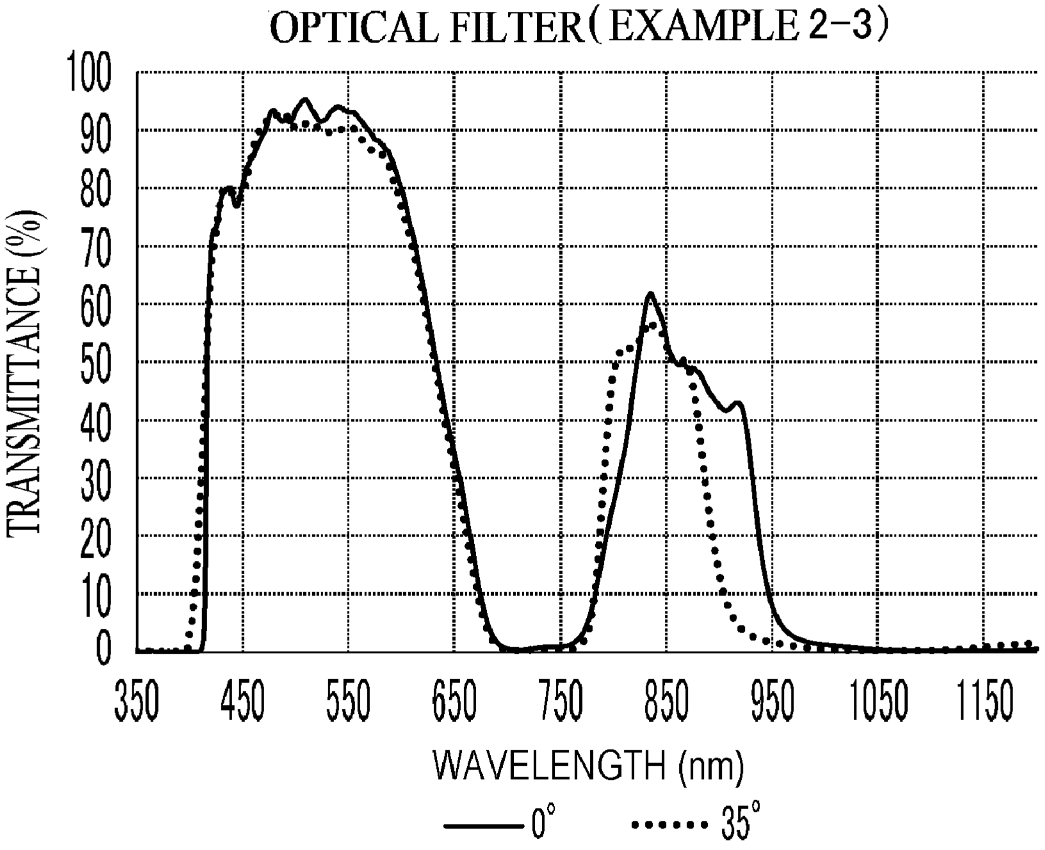
FIG. 7 is a diagram illustrating spectral transmittance curves of an optical filter of Example 2-3.
Figure 8:
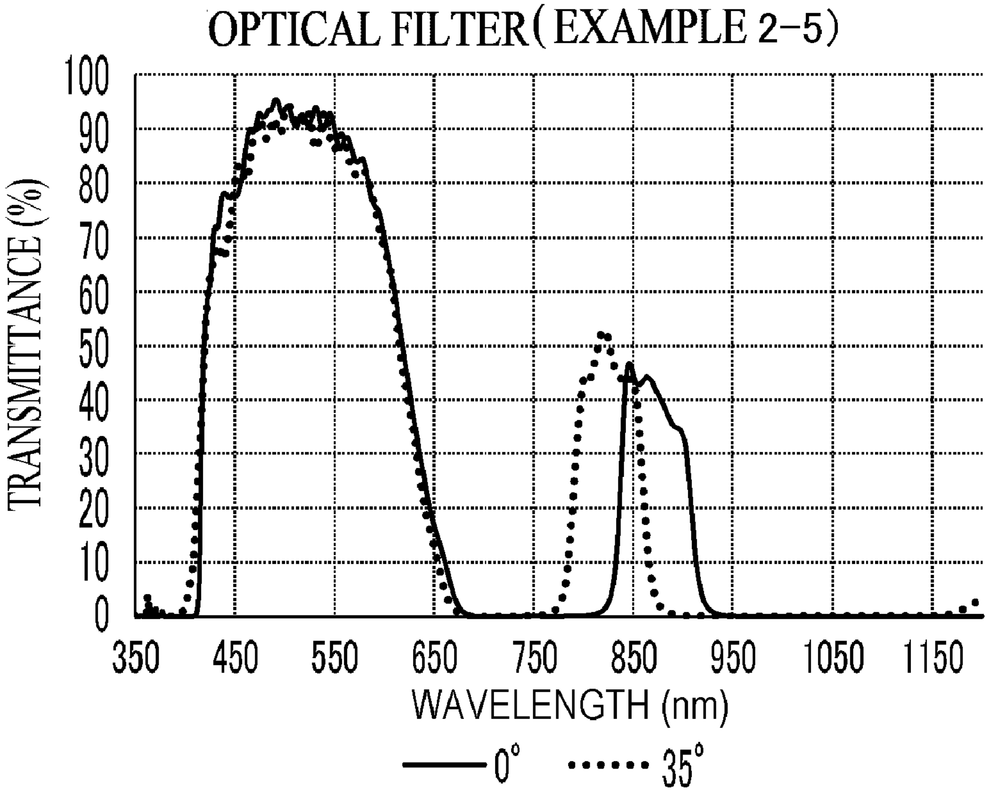
FIG. 8 is a diagram illustrating spectral transmittance curves of an optical filter of Example 2-5.
Figure 9:
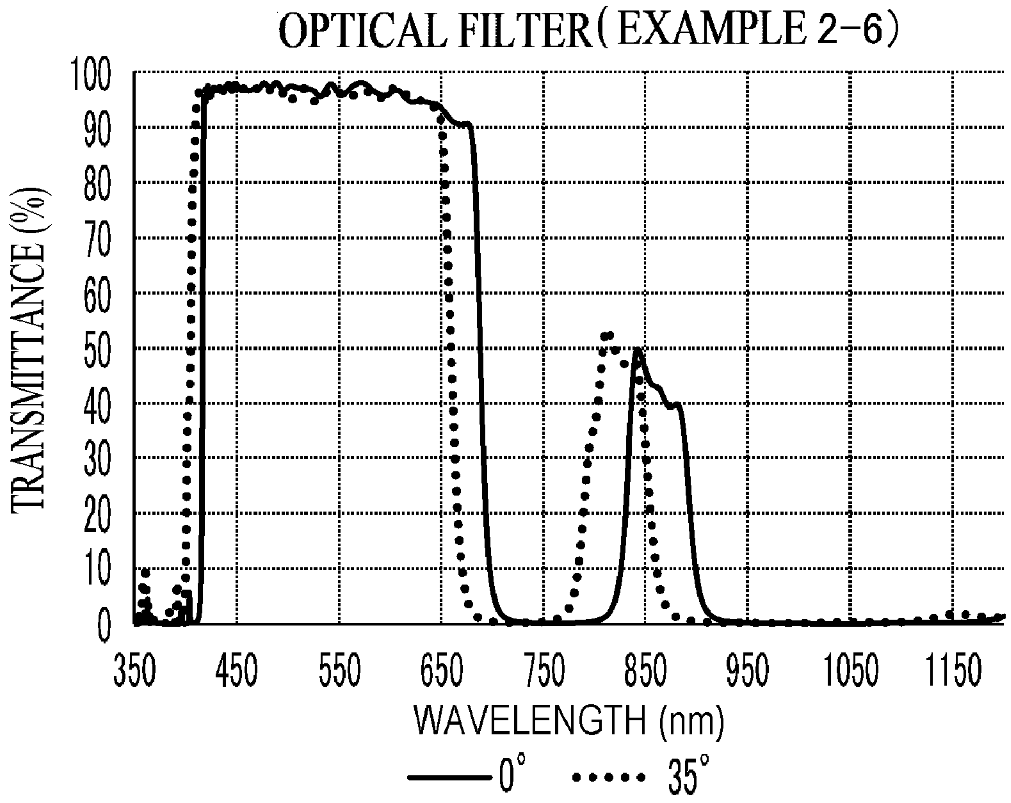
FIG. 9 is a diagram illustrating spectral transmittance curves of an optical filter of Example 2-6.

In addition, spectral transmittance curves of the absorption layers of Examples 1-1 and 1-2 are illustrated in FIG. 4.

Examples 1-1 and 1-2 are reference examples.

TABLE 5

| Absorption layer | | Example 1-1 | Example 1-2 |
|---|---|---|---|
| Added amount of pigment (mass %) | Compound 1 (λMAX: 698 nm) | 7.5 | 10 |
| | Compound 2 (λMAX: 742 nm) | 5.5 | — |
| | Compound 3 (λMAX: 397 nm) | 4.1 | — |
| | Compound 4 (λMAX: 399 nm) | — | 2.9 |
| Film thickness of absorption layer (μm) | | 1 | 1.5 |

TABLE 5-continued

| Absorption layer | | Example 1-1 | Example 1-2 |
|---|---|---|---|
| Spectral characteristics of absorption layer | λA_VIS(30%) (nm) | 657 | 637 |
| | λA_IR(30%) (nm) | 786 | 743 |
| | \|λA_IR(30%)-λA_VIS(30%)\| (nm) | 129 | 106 |
| | AA_450 (%) | 0.1 | 0.1 |
| | AA_720 (%) | 2.3 | 3.3 |
| | AA_720-AA_450 (%) | 2.2 | 3.3 |

Example 2-1: Spectral Characteristics of Optical Filter

A first dielectric multilayer film (reflective film) was formed by alternately laminating 28 layers of $SiO_2$ and $TiO_2$ on or above one surface of an infrared ray absorbing glass (iron phosphate glass) by vapor deposition. A second dielectric multilayer film (reflective film) was formed by alternately laminating 41 layers of $SiO_2$ and $TiO_2$ on or above the other surface of the infrared ray absorbing glass (iron phosphate glass) by vapor deposition.

A resin solution was applied to a surface of the second dielectric multilayer film with the same composition as that of the absorption layer of Example 1-1, and an organic solvent was removed by sufficiently heating to form an absorption layer having a thickness of 1 μm.

A third dielectric multilayer film (antireflection film) was formed by alternately laminating 9 layers of $SiO_2$ and $TiO_2$ on or above a surface of the absorption layer by vapor deposition.

Thus, an optical filter 2-1 was manufactured.

Example 2-2

An optical filter was manufactured in the same manner as in Example 2-1 except that the infrared ray absorbing glass (iron phosphate glass) was changed to a non-absorbing glass (alkaline glass, manufactured by SCHOTT, D263).

Example 2-3

An optical filter was manufactured in the same manner as in Example 2-1 except that the first dielectric multilayer film (reflective film) was formed by alternately laminating 40 layers of $SiO_2$ and $TiO_2$ on or above one surface of the infrared ray absorbing glass (iron phosphate glass) by vapor deposition, and the second dielectric multilayer film (antireflection film) was formed by alternately laminating 19 layers of $SiO_2$ and $TiO_2$ on or above the other surface thereof.

Example 2-4

An optical filter was manufactured in the same manner as in Example 2-1 except that the first dielectric multilayer film (reflective film) was formed by alternately laminating 66 layers of $SiO_2$ and $TiO_2$ on or above one surface of the infrared ray absorbing glass (iron phosphate glass) by vapor deposition, and the second dielectric multilayer film was not formed.

Example 2-5

An optical filter was manufactured in the same manner as in Example 2-1 except that the number of laid layers of the first dielectric multilayer film (reflective film) was 50, the number of laid layers of the second dielectric multilayer film (reflective film) was 39, and a composition of the absorption layer was the same as that in Example 1-2.

Example 2-6

An optical filter was manufactured in the same manner as in Example 2-1 except that the number of laid layers of the first dielectric multilayer film (reflective film) was 82, the number of laid layers of the second dielectric multilayer film (reflective film) was 76, and the absorption layer and the third dielectric multilayer film were not formed.

Example 2-7

An optical filter was manufactured in the same manner as in Example 2-1 except that the infrared ray absorbing glass (iron phosphate glass) was changed to a non-absorbing glass (alkaline glass, manufactured by SCHOTT, D263), the number of laid layers of the first dielectric multilayer film (reflective film) was 50, and the second dielectric multilayer film was not formed.

Reflectance of the first dielectric multilayer film and the second dielectric multilayer film in each of the above-mentioned optical filters is shown in the following table. In a case where the dielectric multilayer film is an outermost layer, the reflectance was estimated as a reflectance on the alkaline glass, and in a case where the dielectric multilayer film is not the outermost layer, the reflectance was estimated as a reflectance when media on both sides are an alkaline glass and a polyimide resin (the resin used in the absorption layer).

With respect to each of the optical filters obtained as described above, spectral transmittance curves at an incident angle of 0 degrees and an incident angle of 35 degrees and a spectral reflectance curve at an incident angle of 5 degrees in a wavelength range of 350 nm to 1,200 nm were measured using an ultraviolet-visible spectrophotometer. The reflection characteristics were measured from a first dielectric multilayer film side or from a third (or second) dielectric multilayer film side.

Respective characteristics shown in the following table were calculated based on the obtained data of the spectral characteristics.

Spectral transmittance curves of the optical filters of Examples 2-1, 2-2, 2-3, 2-5, and 2-6 are illustrated in FIGS. 5 to 9, respectively. A solid line indicates a result of an incident angle of 0 degrees and a broken line indicates a result of an incident angle of 35 degrees.

Examples 2-1, 2-3, and 2-5 are inventive examples, and Examples 2-2, 2-4, 2-6, and 2-7 are comparative examples.

TABLE 6

| | | | Example 2-1 | Example 2-2 | Example 2-3 | Example 2-4 |
|---|---|---|---|---|---|---|
| Configuration of optical filter | Third dielectric multilayer film | Function | Antireflection | Antireflection | Antireflection | Antireflection |
| | | Number of layers | 9 L | 9 L | 9 L | 9 L |
| | | Thickness | 450 nm | 450 nm | 450 nm | 450 nm |
| | Absorption layer | | Example 1-1 | Example 1-1 | Example 1-1 | Example 1-1 |
| | Second dielectric multilayer film | Function | Reflection | Reflection | Antireflection | — |
| | | Number of layers | 41 L | 41 L | 19 L | — |
| | | Film thickness | 2,411 nm | 2,411 nm | 861 nm | — |
| | Spectral characteristics of second dielectric multilayer film | R450-600(5 deg)AVE (%) | 0.5 | 0.5 | 0.1 | — |
| | | R700-750(5 deg)AVE (%) | 11.1 | 11.1 | 1.0 | — |
| | | R800-900(5 deg)AVE (%) | 3.8 | 3.8 | 0.0 | — |
| | | R1000-1200(5 deg)AVE (%) | 94.4 | 94.4 | 5.4 | — |
| | Glass | Glass material type | Iron phosphate | Alkali | Iron phosphate | Iron phosphate |
| | | Thickness | 0.21 mm | 0.21 mm | 0.16 mm | 0.21 mm |
| | First dielectric multilayer film | Function | Reflection | Reflection | Reflection | Reflection |
| | | Number of layers | 28 L | 28 L | 40 L | 66 L |
| | | Film thickness | 1,396 nm | 1,396 nm | 3,218 nm | 4,901 nm |
| | Spectral characteristics of first dielectric multilayer film | R450-600(5 deg)AVE (%) | 0.2 | 0.2 | 1.8 | 2.0 |
| | | R700-750(5 deg)AVE (%) | 2.0 | 2.0 | 10.4 | 2.1 |
| | | R800-900(5 deg)AVE (%) | 1.3 | 1.3 | 14.3 | 1.8 |
| | | R1000-1200(5 deg)AVE (%) | 78.6 | 78.6 | 98.7 | 96.9 |
| Spectral characteristics of optical filter | T450-600(0 deg)AVE (%) | | 91.5 | 92.6 | 90.4 | 89.9 |
| | T700-750(0 deg)AVE (%) | | 0.6 | 0.7 | 0.6 | 0.6 |
| | T1050-1200(0 deg)MAX (%) | | 0.8 | 9.2 | 0.5 | 0.9 |
| | T800-1000(0 deg)MAX (%) | | 62.2 | 99.2 | 61.8 | 54.7 |
| | [T(30%) − T(70%)]/[λ(30%) − λ(70%)] | | −1.0 | −1.0 | −1.0 | −1.0 |
| | \|T(0 deg)(λ) − T(35 deg)(λ)\| (%) | | 2.2 | 2.2 | 4.3 | 4.0 |
| | \|λVIS(0 deg)(50%) − λVIS(35 deg)(50%)\| (nm) | | 4 | 4 | 2 | 2 |
| | λVIS(0 deg)(50%) (nm) | | 637 | 638 | 635 | 635 |
| | λVIS(35 deg)(50%) (nm) | | 633 | 634 | 633 | 633 |
| | \|λIRS(0 deg)(50%) − λIRS(35 deg)(50%)\| (nm) | | 1 | 2 | 15 | 2 |
| | λIRS(0 deg)(50%) (nm) | | 793 | 796 | 806 | 789 |
| | λIRS(35 deg)(50%) (nm) | | 792 | 794 | 791 | 791 |
| | \|λIRL(0 deg)(50%) − λIRL(35 deg)(50%)\| (nm) | | 45 | 49 | 45 | 37 |
| | λIRL(0 deg)(50%) (nm) | | 947 | 959 | 930 | 923 |
| | λIRL(35 deg)(50%) (nm) | | 902 | 910 | 885 | 886 |
| | (First dielectric multilayer film side) R450-600(5 deg)AVE (%) | | 1.5 | 1.5 | 2.6 | 2.8 |
| | (First dielectric multilayer film side) R1050-1200(5 deg)AVE (%) | | 82.0 | 95.7 | 99.1 | 96.1 |
| | (Third dielectric multilayer film side) R450-600(5 deg)AVE (%) | | 1.6 | 1.6 | 2.5 | 2.7 |
| | (Third dielectric multilayer film side) R1050-1200(5 deg)AVE (%) | | 93.5 | 94.9 | 17.8 | 9.0 |

| | | | Example 2-5 | Example 2-6 | Example 2-7 |
|---|---|---|---|---|---|
| Configuration of optical filter | Third dielectric multilayer film | Function | Antireflection | — | Antireflection |
| | | Number of layers | 9 L | — | 9 L |
| | | Thickness | 450 nm | — | 450 nm |
| | Absorption layer | | Example 1-2 | — | Example 1-1 |
| | Second dielectric multilayer film | Function | Reflection | Reflection | — |
| | | Number of layers | 39 L | 76 L | — |
| | | Film thickness | 2,783 nm | 4,038 nm | — |
| | Spectral characteristics of second dielectric multilayer film | R450-600(5 deg)AVE (%) | 0.9 | 0.7 | — |
| | | R700-750(5 deg)AVE (%) | 10.3 | 0.6 | — |
| | | R800-900(5 deg)AVE (%) | 2.7 | 9.1 | — |
| | | R1000-1200(5 deg)AVE (%) | 99.0 | 97.9 | — |
| | Glass | Glass material type | Iron phosphate | Iron phosphate | Alkali |
| | | Thickness | 0.21 mm | 0.21 mm | 0.21 mm |
| | First dielectric multilayer film | Function | Reflection | Reflection | Reflection |
| | | Number of layers | 50 L | 82 L | 50 L |
| | | Film thickness | 4,076 nm | 3,186 nm | 4,076 nm |
| | Spectral characteristics of first dielectric multilayer film | R450-600(5 deg)AVE (%) | 1.9 | 0.8 | 1.9 |
| | | R700-750(5 deg)AVE (%) | 89.2 | 99.0 | 89.2 |
| | | R800-900(5 deg)AVE (%) | 37.8 | 32.7 | 37.8 |
| | | R1000-1200(5 deg)AVE (%) | 83.6 | 46.0 | 83.6 |
| Spectral characteristics of optical filter | T450-600(0 deg)AVE (%) | | 87.8 | 96.9 | 91.4 |
| | T700-750(0 deg)AVE (%) | | 0.0 | 1.0 | 0.1 |
| | T1050-1200(0 deg)MAX (%) | | 0.1 | 1.4 | 81.8 |
| | T800-1000(0 deg)MAX (%) | | 46.7 | 49.7 | 99.0 |
| | [T(30%) − T(70%)]/[λ(30%) − λ(70%)] | | −1.2 | −6.5 | −0.9 |
| | \|T(0 deg)(λ) − T(35 deg)(λ)\| (%) | | 7.7 | 2.8 | 6.5 |
| | \|λVIS(0 deg)(50%) − λVIS(35 deg)(50%)\| (nm) | | 3 | 29 | 4 |
| | λVIS(0 deg)(50%) (nm) | | 619 | 688 | 637 |
| | λVIS(35 deg)(50%) (nm) | | 616 | 659 | 633 |
| | \|λIRS(0 deg)(50%) − λIRS(35 deg)(50%)\| (nm) | | 47 | 42 | 40 |
| | λIRS(0 deg)(50%) (nm) | | 837 | 832 | 838 |
| | λIRS(35 deg)(50%) (nm) | | 790 | 790 | 798 |

TABLE 6-continued

| | | | |
|---|---|---|---|
| \|λIRL(0 deg)(50%) − λIRL(35 deg)(50%)\| (nm) | 47 | 39 | 50 |
| λIRL(0 deg)(50%) (nm) | 907 | 892 | 910 |
| λIRL(35 deg)(50%) (nm) | 860 | 853 | 860 |
| (First dielectric multilayer film side) R450-600(5 deg)AVE (%) | 3.5 | 1.5 | 2.8 |
| (First dielectric multilayer film side) R1050-1200(5 deg)AVE (%) | 78.5 | 33.0 | 79.1 |
| (Third dielectric multilayer film side) R450-600(5 deg)AVE (%) | 3.3 | 1.5 | 2.6 |
| (Third dielectric multilayer film side) R1050-1200(5 deg)AVE (%) | 98.8 | 97.6 | 78.6 |

From the above-mentioned results, it is understood that the optical filters of Examples 2-1, 2-3, and 2-5 are optical filters that are excellent in transmittance of visible light and a near infrared light in 800 nm to 900 nm, excellent in shielding property of other near infrared light particularly in a wavelength region of 1,000 nm to 1,200 nm, further excellent in a visual sensitivity correction property in a visible region, and have a high reliability on a weather resistance. Further, in the optical filters of Examples 2-1 and 2-3 in which two types of NIR pigments were used, since $|\lambda_{IRS(0deg)(50\%)}-\lambda_{IRS(35deg)(50\%)}|$ was 30 nm or less, a spectral curve in a region of 750 nm to $\lambda_{800\text{-}1000(0deg)MAX}$ nm is hardly shifted even at a high incident angle.

In the optical filters of Examples 2-2 and 2-7 in which the near infrared ray absorbing glass was not used, the maximum transmittance $T_{1050\text{-}1200(0deg)MAX}$ exceeded 7%, and the light shielding property in 1,050 nm to 1,200 nm was low.

Examples 3-1 to 3-3: Reliability Test

A relation between a film thickness of the dielectric multilayer film formed on or above the near infrared ray absorbing glass and reliability was evaluated.

A dielectric multilayer film was formed by alternately laminating $SiO_2$ and $TiO_2$ on or above one surface of an infrared ray absorbing glass (iron phosphate glass) by vapor deposition. The number of laid layers of each dielectric multilayer film is as shown in the following table.

A glass substrate with the dielectric multilayer film was left for 250 hours at 85° C. and in an atmosphere of a relative humidity of 85%, and then an appearance was observed. In addition, a tape (adhesive force of 3.9N/10 mm, Cellotape (registered trademark) manufactured by NICHIBAN CO., LTD., corresponding to No. 405) was brought into close contact with the surface of the dielectric multilayer film, and then the tape was peeled in a vertical direction, and a peeling test was performed.

Results are shown in the following table.

Examples 3-1 to 3-3 are reference examples.

TABLE 7

| | | | Example 3-1 | Example 3-2 | Example 3-3 |
|---|---|---|---|---|---|
| Configuration | Dielectric multilayer film layer | Film material | $SiO_2/TiO_2$ | $SiO_2/TiO_2$ | $SiO_2/TiO_2$ |
| | | Number of layers | 7 L | 19 L | 42 L |
| | | Film thickness | 370 nm | 861 nm | 4,951 nm |
| | Glass substrate | Glass material type | Iron phosphate glass | Iron phosphate glass | Iron phosphate glass |
| | | Thickness | 0.21 mm | 0.21 mm | 0.21 mm |
| Reliability | Performing tape test after charging at 85° C./85% RH/250 h | | Poor Elution of glass from end face was confirmed. Peeling occurred at about 100 μm from end surface after tape test. | Good | Good |

It is presumed, based on results of a reliability test of Examples 3-1 to 3-3 to be described later, that the optical filter of Example 2-4 in which the absorption layer was laid on or above one major surface of the near infrared ray absorbing glass and no multilayer film was laid on or above either surfaces of the glass was an optical filter in which the glass was easily deteriorated and the reliability was low.

In the optical filter of Example 2-6 in which no absorption layer was provided. $[T_{(30\%)}-T_{(70\%)}]/[\lambda_{(30\%)}-\lambda_{(70\%)}]$ was smaller than −2, and the visual sensitivity correction property of the visible region was low.

From the above-mentioned results, it is understood that the film thickness of the dielectric multilayer film is preferably large from the viewpoint of preventing deterioration of the near infrared ray absorbing glass.

Although the present invention has been described in detail with reference to specific embodiments, it is apparent to those skilled in the art that various changes and modifications can be made without departing from the spirit and scope of the present invention. The present application is based on a Japanese patent application (No. 2021-126030) filed on Jul. 30, 2021, and the contents thereof are incorporated herein by reference.

INDUSTRIAL APPLICABILITY

The optical filter according to the present invention is excellent in transmittance of visible light and a specific near infrared light, and has shielding property of other near infrared light. The optical filter is useful for applications of information acquisition devices such as cameras and sensors for transport machines, for which a high performance has been achieved in recent years.

REFERENCE SIGNS LIST

1A, 1B: optical filter
10: near infrared ray absorbing glass
21, 22, 23: dielectric multilayer film
30: absorption layer

What is claimed is:

1. An optical filter, comprising:
a near infrared ray absorbing glass,
dielectric multilayer films laid on or above both major surfaces of the near infrared ray absorbing glass, and
an absorption layer laid on or above a surface of at least one of the dielectric multilayer films and having a maximum absorption wavelength in a near infrared light region, wherein
the optical filter satisfies all of the following spectral characteristics (i-1) to (i-5):
(i-1) in a spectral transmittance curve at a wavelength of 450 nm to 600 nm and an incident angle of 0 degrees, an average transmittance $T_{450\text{-}600(0deg)AVE}$ is 60% or more,
(i-2) in a spectral transmittance curve at a wavelength of 700 nm to 750 nm and an incident angle of 0 degrees, an average transmittance $T_{700\text{-}750(0deg)AVE}$ is 5% or less,
(i-3) in a spectral transmittance curve at a wavelength of 1,050 nm to 1,200 nm and an incident angle of 0 degrees, a maximum transmittance $T_{1050\text{-}1200(0deg)MAX}$ is 7% or less,
(i-4) in a spectral transmittance curve at a wavelength of 800 nm to 1,000 nm and an incident angle of 0 degrees, a maximum transmittance $T_{800\text{-}1000(0deg)MAX}$ is 20% or more, and
(i-5) when a maximum transmittance in the spectral transmittance curve at a wavelength of 450 nm to 600 nm and an incident angle of 0 degrees is $T_{450\text{-}600(0deg)MAX}$;
in the spectral transmittance curve at an incident angle of 0 degrees, a wavelength $\lambda_{(70\%)}$ at which a transmittance is 70% of $T_{450\text{-}600(0deg)MAX}$ and a wavelength/(30%) at which a transmittance is 30% of $T_{450\text{-}600(0deg)MAX}$ are included in a range of 600 nm to 700 nm, and
when the transmittance at the wavelength $\lambda_{(70\%)}$ is $T_{(70\%)}$ and the transmittance at the wavelength $\lambda_{(30\%)}$ is $T_{(30\%)}$, the following relational expression is satisfied:

$$-2\leq[T_{(30\%)}-T_{(70\%)}]/[\lambda_{(30\%)}-\lambda_{(70\%)}]\leq-0.75.$$

2. The optical filter according to claim 1, further satisfying the following spectral characteristic (i-6):
(i-6) when a transmittance at a wavelength A in a spectral transmittance curve at an incident angle of 0 degrees is $T_{(0deg)}(\lambda)$ and a transmittance at the wavelength $\lambda$ in a spectral transmittance curve at an incident angle of 35 degrees is $T_{(35deg)}(\lambda)$, the following relational expression is satisfied in a wavelength range of 450 nm$\leq\lambda\leq$600 nm:

$$|T_{(0deg)}(\lambda)-T_{(35deg)}(\lambda)|\leq 10\%$$

3. The optical filter according to claim 1, further satisfying the following spectral characteristic (i-7):
(i-7) when the maximum transmittance in the spectral transmittance curve at a wavelength of 450 nm to 600 nm and an incident angle of 0 degrees is $T_{450\text{-}600(0deg)MAX}$;
a wavelength $\lambda_{VIS(0deg)(50\%)}$ at which $T_{450\text{-}600(0deg)MAX}$ is 50% at an incident angle of 0 degrees and a wavelength $\lambda_{VIS(35deg)(50\%)}$ at which $T_{450\text{-}600(0deg)MAX}$ is 50% at an incident angle of 35 degrees are included in the range of 600 nm to 700 nm, and
the following relational expression is satisfied:

$$|\lambda_{VTS(0deg)(50\%)}-\lambda_{VIS(35deg)(50\%)}\leq 10\text{ nm}.$$

4. The optical filter according to claim 1, further satisfying the following spectral characteristic (i-8):
(i-8) in the spectral transmittance curve at a wavelength of 800 nm to 1,000 nm and an incident angle of 0 degrees, when the maximum transmittance is $T_{800\text{-}1000(0deg)MAX}$ and a wavelength at which the maximum transmittance is obtained is $T_{800\text{-}1000(0deg)MAX}$,
a wavelength $\lambda_{IRS(0deg)(50\%)}$ at which a transmittance is 50% of $T_{800\text{-}1000(0deg)MAX}$ in a spectral transmittance curve in a range of 750 nm to $\lambda_{800\text{-}1000(0deg)MAX}$ nim and at an incident angle of 0 degrees, and
a wavelength $\lambda_{IRS(35deg)(50\%)}$ at which a transmittance is 50% of $T_{800\text{-}1000(0deg)MAX}$ In a spectral transmittance curve in the range of 750 nm to $\lambda_{800\text{-}1000(0deg)MAX}$ nm and at an incident angle of 35 degrees satisfy the following relational expression:

$$|\lambda_{IRS(0deg)(50\%)}-\lambda_{IRS(35deg)(50\%)}|\leq 30\text{ nm}.$$

5. The optical filter according to claim 1, further satisfying the following spectral characteristic (i-9):
(i-9) in the spectral transmittance curve at a wavelength of 800 nm to 1,000 nm and an incident angle of 0 degrees, when the maximum transmittance is $T_{800\text{-}1000(0deg)MAX}$ and a wavelength at which the maximum transmittance is obtained is $T_{800\text{-}1000(0deg)MAX}$,
a wavelength $\lambda_{IRL(0deg)(50\%)}$ at which a transmittance is 50% of $T_{800\text{-}1000(0deg)MAX}$ In a spectral transmittance curve in a range of $\lambda_{800\text{-}1000(0deg)MAX}$ nm to 1,050 nm and at an incident angle of 0 degrees, and
a wavelength $\lambda_{IRL(35deg)(50\%)}$ at which a transmittance is 50% of $T_{800\text{-}1000(0deg)MAX}$ in a spectral transmittance curve in the range of $\lambda_{800\text{-}1000(0deg)MAX}$ nm to 1,050 nm and at an incident angle of 35 degrees satisfy the following relational expression:

$$|\lambda_{IRL(0deg)(50\%)}-\lambda_{IRL(35deg)(50\%)}|\leq 60\text{ nm}.$$

6. The optical filter according to claim 1, wherein each of the dielectric multilayer films laid on or above the both major surfaces of the near infrared ray absorbing glass has a thickness of 600 nm or more.

7. The optical filter according to claim 1, wherein the near infrared ray absorbing glass is a fluorophosphate glass comprising iron or copper or a phosphate glass comprising iron or copper.

8. The optical filter according to claim 1, wherein the near infrared ray absorbing glass satisfies all of the following spectral characteristics (iii-1) to (iii-3):
(iii-1) an average internal transmittance $T_{G\_450\text{-}600AVE}$ in a spectral transmittance curve at the wavelength of 450 nm to 600 nm is 80% or more,
(iii-2) an average internal transmittance $T_{G\_1050\text{-}1200AVE}$ in a spectral transmittance curve at the wavelength of 1,050 nm to 1,200 nm is lower than the average internal transmittance $T_{G\_450\text{-}600AVE}$, and (iii-3) an internal transmittance $T_{G\_800\text{-}1000}$ at the wavelength of 800 nm to 1,000 nm monotonically decreases.

9. The optical filter according to claim 1, wherein the absorption layer comprises a pigment having a maximum absorption wavelength in 680 nm to 800 nm in dichloromethane.

10. The optical filter according to claim 1, further satisfying the following spectral characteristics (i-10) and (i-11):

(i-10) in a spectral reflectance curve at an incident angle of 5 degrees on at least one of surfaces, an average reflectance $R_{450\text{-}600(5deg)AVE}$ at the wavelength of 450 nm to 600 nm is 15% or less, and (i-11) in the spectral reflectance curve at an incident angle of 5 degrees on at least one of surfaces, an average reflectance $R_{450\text{-}1200(5deg)AVE}$ at the wavelength of 1,050 nm to 1,200 nm is 40% or more.

11. The optical filter according to claim 1, wherein the absorption layer satisfies both the following spectral characteristics (ii-1) and (ii-2):

(ii-1) when a shortest wavelength at which an internal transmittance is 30% in a spectral transmittance curve at a wavelength of 650 nm to 720 nm is $\lambda_{A\_VIS(30\%)}$, and a shortest wavelength at which an internal transmittance is 30% in a spectral transmittance curve at a wavelength of 720 nm to 1,000 nm is $\lambda_{A\_IR(30\%)}$, the following relational expression is satisfied:

$$|\lambda_{A\_IR(30\%)}-\lambda_{A\_VIS(30\%)}|\geq 100\text{ nm, and}$$

(ii-2) when an absorbance at a wavelength of 450 nm is $A_{A\_450}$ and an absorbance at a wavelength of 720 nm is $A_{A\_720}$, the following relational expression is satisfied:

$$A_{A\_720}-A_{A\_450}\geq 1.$$

12. An imaging device comprising the optical filter according to claim 1.

* * * * *